(12) United States Patent
Boies et al.

(10) Patent No.: US 6,981,019 B1
(45) Date of Patent: Dec. 27, 2005

(54) SYSTEM AND METHOD FOR A COMPUTER BASED COOPERATIVE WORK SYSTEM

(75) Inventors: Stephen J. Boies, Mahopac, NY (US); Yiming Ye, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/562,915

(22) Filed: May 2, 2000

(51) Int. Cl.[7] ............................................. G06F 15/16
(52) U.S. Cl. ...................... 709/204; 709/201; 709/202; 709/206
(58) Field of Search ............................... 709/217, 204, 709/202, 206, 201

(56) References Cited

U.S. PATENT DOCUMENTS

| | | | |
|---|---|---|---|
| 5,068,645 A | 11/1991 | Drumm | |
| 5,295,067 A | 3/1994 | Cho et al. | |
| 5,353,384 A | 10/1994 | Yoshida | |
| 5,396,265 A | 3/1995 | Ulrich et al. | |
| 5,418,889 A | 5/1995 | Ito | |
| 5,708,853 A | 1/1998 | Sanemitsu | |
| 5,781,732 A | 7/1998 | Adams | |
| 5,861,883 A * | 1/1999 | Cuomo et al. ............... | 345/733 |
| 5,901,244 A * | 5/1999 | Souma et al. ............... | 382/190 |
| 5,948,057 A | 9/1999 | Berger et al. | |
| 5,978,851 A * | 11/1999 | Kayama et al. .............. | 709/232 |
| 5,996,002 A | 11/1999 | Katsurabayashi et al. | |
| 6,233,600 B1 * | 5/2001 | Salas et al. .................. | 709/201 |
| 6,308,199 B1 * | 10/2001 | Katsurabayashi ........... | 709/204 |
| 6,314,178 B1 * | 11/2001 | Walker et al. ......... | 379/266.01 |
| 6,342,906 B1 * | 1/2002 | Kumar et al. ................ | 345/751 |
| 6,446,113 B1 * | 9/2002 | Ozzie et al. ................. | 709/204 |
| 6,480,885 B1 * | 11/2002 | Olivier ........................ | 709/207 |
| 6,505,233 B1 * | 1/2003 | Hanson et al. .............. | 709/204 |
| 6,526,156 B1 * | 2/2003 | Black et al. ................. | 382/103 |
| 6,535,909 B1 * | 3/2003 | Rust ............................ | 709/204 |
| 6,640,241 B1 * | 10/2003 | Ozzie et al. ................. | 709/204 |

* cited by examiner

*Primary Examiner*—Saleh Najjar
(74) *Attorney, Agent, or Firm*—Greenblum & Bernstein, P.L.C.

(57) ABSTRACT

An agent mediated Computer Supported Cooperative Work (CSCW) system creates a sense of group work and at the same time keeps the privacy and maintains the security of each user. A multi-agent negotiation process is used in the system to reduce fractions among group members during the geographically distributed team work. A markup language, such as XML (eXtended Markup Language), is used in the system to encode communication messages. Event perception is an important task in agent mediated CSCW system which uses an eigen space to perform the event perception task. For the case where the number of devices is large, an eigen pyramid is constructed which can be used to discriminate different events.

16 Claims, 26 Drawing Sheets

$$[A_i] = ([r^{i,1}] \; [r^{i,2}] \; \ldots \; [r^{i, N_{examplar}}])$$

THE READINGS FOR ALL THE EXAMPLARS FOR EVENT i DURING THE MODEL BUILDING PHASE

FIG. 9

$$[A] = ([[r^{1,1}]] \ldots [r^{1, N_{examplar}}] \ldots [r^{N_{event},1}] \ldots [r^{N_{event}, N_{examplar}}])$$

THE READINGS FOR ALL THE EXAMPLARS FOR ALL THE EVENTS DURING THE MODEL BUILDING PHASE

FIG. 11

αe=−1: DO NOT DISPLAY; αe=0: DISPLAY EXACTLY THE REAL SITUATION; αe=i>0, DISPLAY THE ITH VALUE OF THE EVENT i

SYSTEM AND METHOD FOR A COMPUTER BASED COOPERATIVE WORK SYSTEM

BACKGROUND OF THE INVENTION

1. Field of the Invention

The present invention generally relates to computer supported collaborated work and, more particularly, to intelligently collaborating with computers in a network with one or more agents.

2. Background Description

With ubiquitous connectivity on the horizon, collaborative computing promises to become one of this new century's core applications. People will be more and more involved in Computer Supported Cooperative Work (CSCW) because of the pressure from companies to improve their product-development and decision making process and because of the convenience brought by the information super-highway.

There are four modes conceptualized by CSCW researchers on how people work; synchronous mode, distributed synchronous mode, asynchronous mode, and distributed asynchronous mode. Synchronous mode refers to the situation where activities occur at the same time and in the same place. Distributed synchronous mode refers to the situation where activities occur at the same time but at different places. Asynchronous mode refers to the situation where activities occur at different times in the same place. Distributed asynchronous mode refers to the situation where activities occur at different times and places.

Many computer systems support simultaneous interaction by more than one user. However, most of them support multiuser interaction in a way that prohibits cooperation; that is, they give each user the illusion that the user is the only one using the system. To support and encourage cooperation, cooperative applications must allow users to be aware of the activities of others. The purpose of a cooperative multiuser interface is to establish and maintain a common context, allowing the activities or events associated with one user to be reflected on other users' screens. For example, Lotus® Sametime is a family of real-time collaboration products which provides instant awareness, communication, and document sharing capabilities, bringing the flexibility and efficiency of real-time communication to the business world.

With awareness of coworkers, partners, or customers online, users can communicate in a variety of ways. However, a direct reflection of all the activities on other users' screen is not approachable. The first reason is that it wastes communication bandwidth, especially when users are far apart and the amount of data to be transmitted, such as video data, is huge. The second reason is that many users may not like the situation that his or her activities are broadcasted to all the other members of the team. The third reason is that each user is concentrating on his or her own work and does not have the energy and motivation to monitor every movement of other users.

Thus, it is critical for CSCW interface to analyze activities of a given user, detect that important events have occurred, and only reflect necessary events to other agents.

Event perception will be even more important to CSCW in the pervasive computing world, where the dominance of the traditional PC as the primary computing resource is replaced by a large collection of devices with embedded computing. These intelligent, interconnected devices will be seamlessly embedded within our offices, constantly sensing and reacting to the environment. The information provided by these pervasive devices within an office environment will be very important in CSCW applications.

Autonomous agents are expected to be of great value to a CSCW system and a certain amount of future research on CSCW will be centered on multi-agent aspect of groupware. A multi-agent approach to CSCW can capture the dynamics of a team work and even re-shape its form and characteristics. The automation brought by CSCW agents will dramatically reduce certain types of frictional costs during team work. Furthermore, the intelligence of a multi-agent CSCW system will be able to keep the privacy of its user and the security of each user's local work.

PRIOR ART

Collaborative computing systems, sensing devices of various kinds that provide input to computer systems, and knowledge base or expert systems are generally known in the prior art. Some examples include the following:

U.S. Pat. No. 5,996,002 to Katsurabayashi et al. discloses a collaborative work support system that is performed on plural computers, each of which is assigned to an operator, and supports collaborative work in which the plural computers display common data and each operator operates the displayed common data through his or her own computer.

U.S. Pat. No. 5,948,057 to Berger et al. discloses a method for computer-supported matching of a number of data copies of a stored data file stored in at least one computer, in the reintegration of a number of data copies that were changed during decoupled work phases by uses of a shared work environment, ad thus exhibit inconsistencies. The reintegration is conducted so that the number of matchings is reduced on the basis of protocol data files.

U.S. Pat. No. 5,781,732 to Adams discloses a shared document framework for use by an application program that provides collaborative access to a shared document by means of a caucus service associated with the shared document. The caucus service receives messages from caucus members and broadcast transmits them to all caucus members in global order.

U.S. Pat. No. 5,708,853 to Sanemitsu discloses an integrated circuit (IC) card having a camera, a microphone and a modem for transmitting electrical signals from the camera and microphone to a telephone or communication line, or transmits signals received from the communication line to a terminal, such as a personal computer (PC).

U.S. Pat. No. 5,396,265 to Ulrich et al. discloses a tactile computer input device which simulates an object being designed. The input device is used with a computer aided design (CAD) system and allows a user to manually manipulate the input device as if it were the object under design.

U.S. Pat. No. 5,068,645 to Drumm discloses a device for controlling a cursor on a data terminal display screen. The device is in the form of a headset and includes an orientation sensor which provides an electrical signal related to the orientation of the device without it being adjacent to any fixed surface.

U.S. Pat. No. 5,418,889 to Ito discloses a knowledge base generating system that includes a knowledge base having a first knowledge base containing sets of causal relation knowledge described cause and effect relations of events taking place within a target machine, and having a second knowledge base containing sets of membership knowledge describing a structure of members of the target machine, each event of the cause and effect relations having data to identify one of the members, so that the first and second knowledge bases have mutually retrievable data.

U.S. Pat. No. 5,353,384 to Yoshida discloses an expert system which includes a first knowledge base for storing detailed knowledge, a second knowledge base for storing compiled knowledge, an inference engine for solving a problem using the second knowledge base, and an analysis engine for extracting knowledge having high utilization from the first knowledge base and storing the extracted knowledge in the second knowledge base.

U.S. Pat. No. 5,295,067 to Cho et al. discloses a system for order planning that translates an order configuration into a list of bills of materials list. The system operates based on a first logical specification of relationships between models, optional features or device codes and required material components.

SUMMARY OF THE INVENTION

It is therefore an object of the present invention to provide a new event perception algorithm that can perceive events in the user's workspace.

It is another object of this invention to provide an architecture of agent mediated CSCW.

A further object of this invention is to provide an improved apparatus, system, and method for computer collaboration over a network.

According to the invention, there is provided an agent mediated CSCW system that can create a sense of group work and at the same time keep the privacy and maintain the security of each user. A multi-agent negotiation process is used in the system to reduce fractions among group members during the geographically distributed team work. A markup language, such as XML (eXtended Markup Language), is used in the system to encode communication messages. (See, for example, http://www.ibm.com/developer/xml.) Event perception is an important task in agent mediated CSCW system which uses an eigen space to perform the event perception task. For the case where the number of devices is large, an eigen pyramid is constructed which can be used to discriminate different events. For more information on the eigen space approach, see *Numerical Recipes in C* by William H. Press, Saul Teukolsky, William T. Vetterling, and Brian P. Flannery.

BRIEF DESCRIPTION OF THE DRAWINGS

The foregoing and other objects, aspects and advantages will be better understood from the following detailed description of a preferred embodiment of the invention with reference to the drawings, in which:

FIG. 9 is a graphical illustration of the readings for all the exemplars of event i;

FIG. 11 is a graphical illustration showing in more detail the data matrix;

DETAILED DESCRIPTION OF A PREFERRED EMBODIMENT OF THE INVENTION

Figure 1:
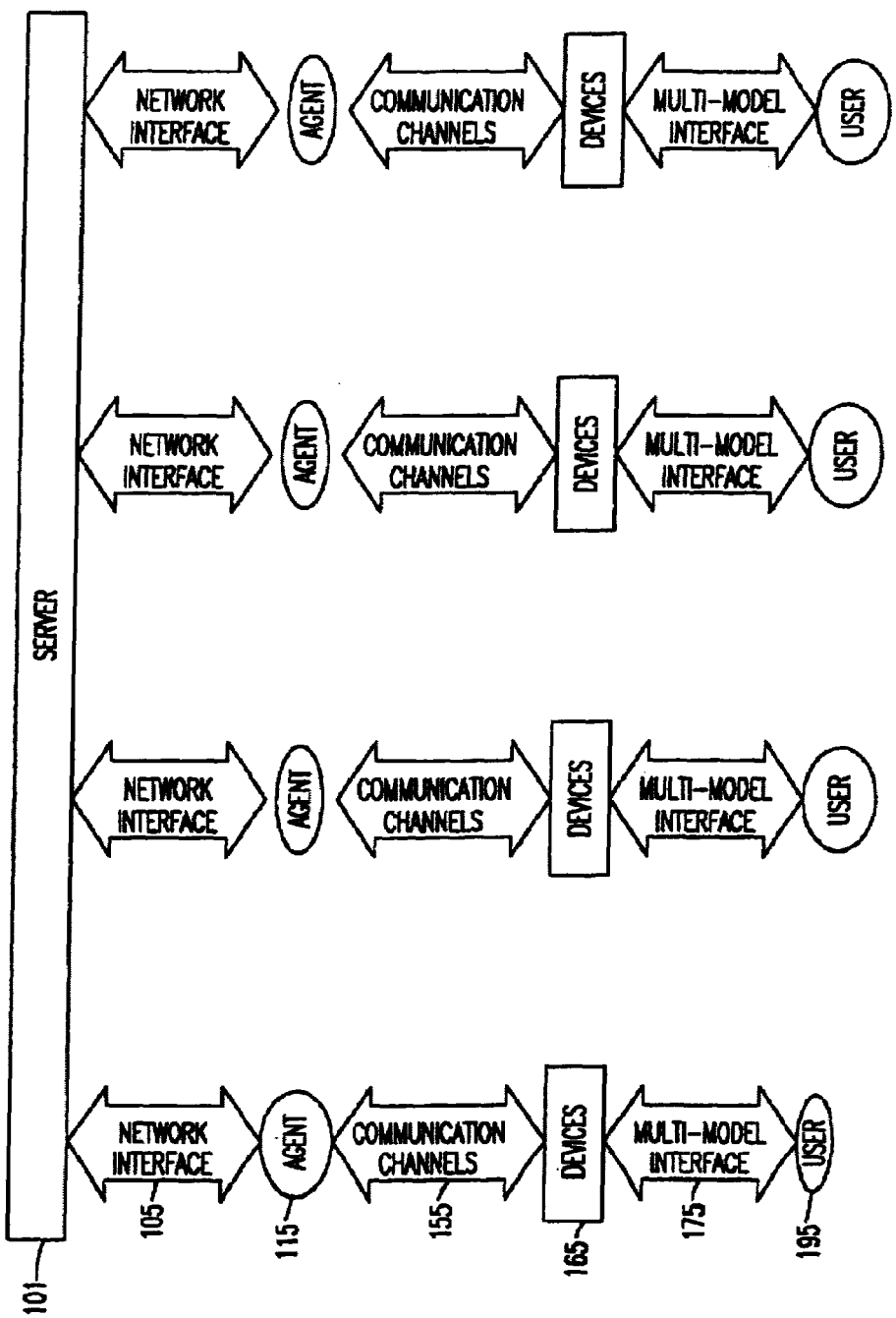
FIG. 1 is a block diagram of a preferred system architecture of the invention.

In this disclosure, we will present the system architecture of an agent mediated CSCW system and study in detail its event perception issues. Referring now to the drawings, and more particularly to FIG. 1, there is shown a block diagram of one preferred system architecture. Block 101 is the server, which handles the messages among agents. Block 105 is the network channel between the agent 115 and the server 101. 155 denotes the communication channels between the devices 165 and the agent 115. It can be in any form. For example, a device 165 may be a camera which, after it analyzes an image, can divide the results into several categories and send the message through a TCP/IP (Transfer Control Protocol/Internet Protocol) channel 155. Another example, a device 165 may be a keyboard which, after the user hits a key, generates a signal that can be grabbed and sent to the agent 115 via a TCP/IP channel 155. In general, the devices 165 are used for the system to perform event perception. They can be a camera, a keyboard, a sensitive touch screen, a weight sensor, a motion sensor, and many other devices that can sense the environment. The user 195 uses a multi-modal communication channel 175 for communicating with devices in the environment. Channel 175 is actually the sensing channel for the devices to sense the environment and the user and various activities. The devices 165 keep sensing the environment and user 195 through multi-modal channels 175. The sensing results are categorized and send to the agent 115. The agent 115 analyzes the data and keeps detecting what has happened. When other agents ask about the status of its user, after a negotiation process, the agent provides relevant information.

Figure 2:
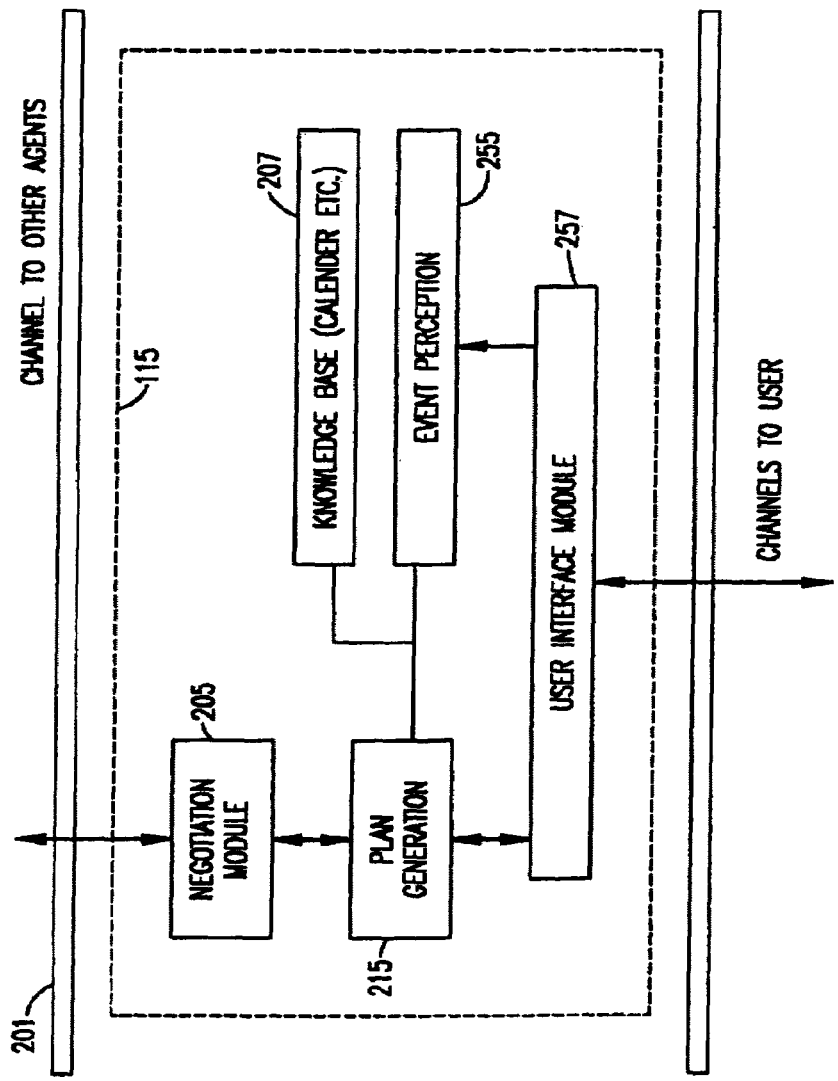
FIG. 2 is a block diagram of a preferred single agent component of the invention.

FIG. 2 is a preferred diagram on a single agent component. Negotiation module 205 is responsible for negotiations with another agent or agents. It is responsible for parsing messages back and forth between itself and another agent. When it wants to pass information to other agents, it first sends the information to the server 101 (FIG. 1), then the server passes the information to the other agent or agents. The communications between them can be through a TCP/IP channel. When another agent or agents send message to the current agent, they also go through the server. They first send the message to the server, then the server transfers the message to the negotiation module 205 of the current agent. The negotiation module 205 passes messages back and forth between plan generation module 215. The plan generation module 215 generates plans for the agent to negotiate with other agents, or to transmit information through multi-modal user interface module 257 and finally received by the user. The plan generation module 215 consults the event perception module 255 and the knowledge data base 207 so as to generate plans. The knowledge data base 207 stores various data bases for the user, such as the user's day-to-day calendar, appointment schedule, and the like. The calendar can be meeting schedules, teleconferencing schedules, telephone call schedules, and many others. It also has some inference rule in one way or another so as to generate plans. For example, if the user is going to having a meeting with John at 1:00 o'clock, then he should not have any other appointments with Mary or other people in his department at this time. But when the CEO of the company want to meet him at this time, the knowledge data base should overwrite John's meeting. There are many ways to store data and relevant inference rules, as well understood by those skilled in the art of expert systems. Knowledge data base 207 can use any of them. Event perception module 255 perceives events and provide the results to plan generation module 215 when queried. Plan generation module 215 generates plans by various intelligent ways based on the content of event perception module 255 and knowledge data base 207.

Figure 3:
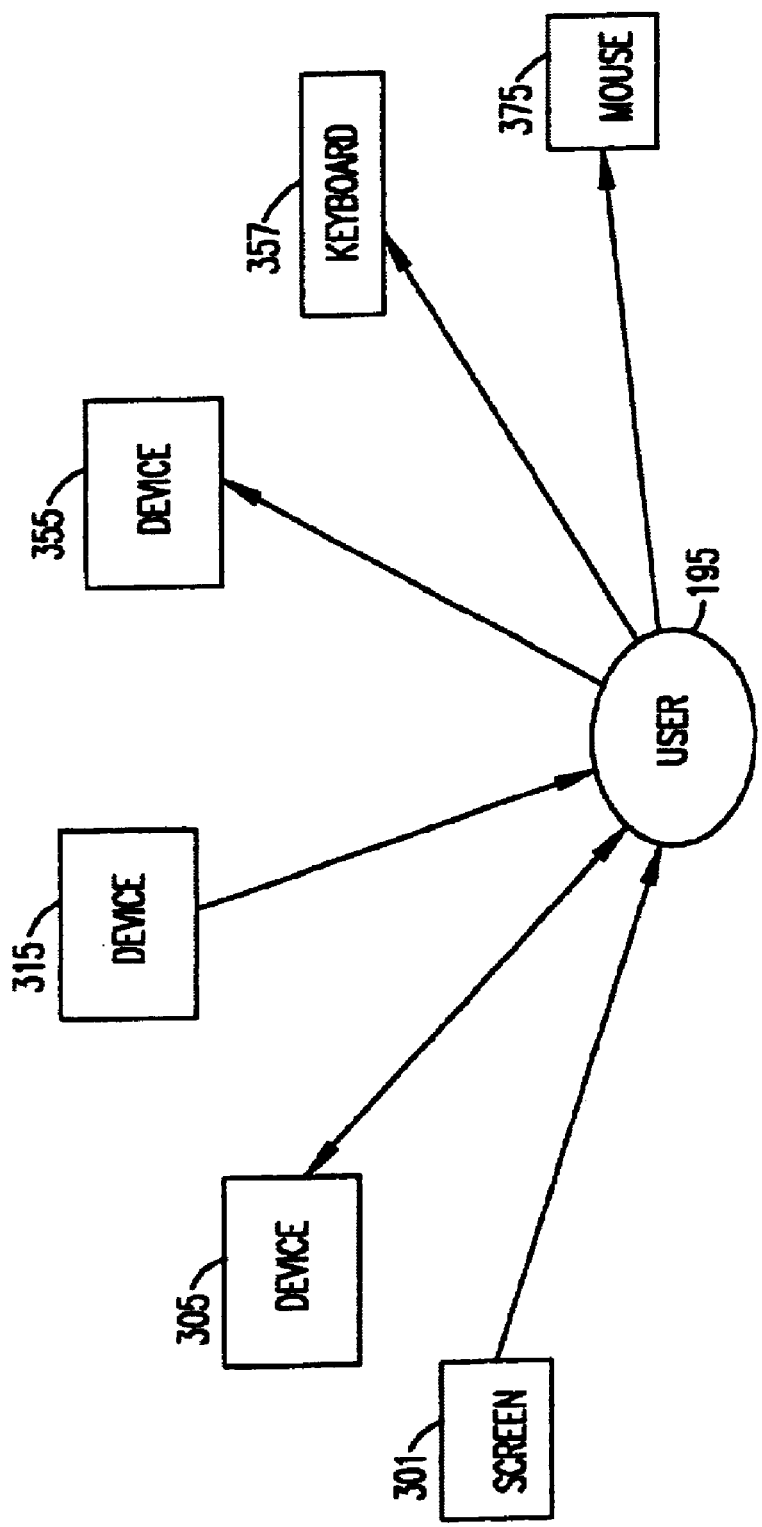
FIG. 3 is a diagram illustrating the situation for the user within his or her working environment.

FIG. 3 illustrates the situation for the user within his or her working environment. The user 195 is surrounded by various devices such as screen 301, keyboard 357, mouse 375, and other devices 305, 315 and 355 (any of which may be, for example, a touch sensitive screen, a motion sensor and a weight sensor). Some devices are only for output of information to the user, such as, say, devices 301 and 315. Some devices are only for input from the user or environment, such as, say, devices 355, 357 and 375. Other devices can be bi-directional. For example, the screen 301 could be a touch screen both displaying information to the user and receiving input from the user.

Figure 4:
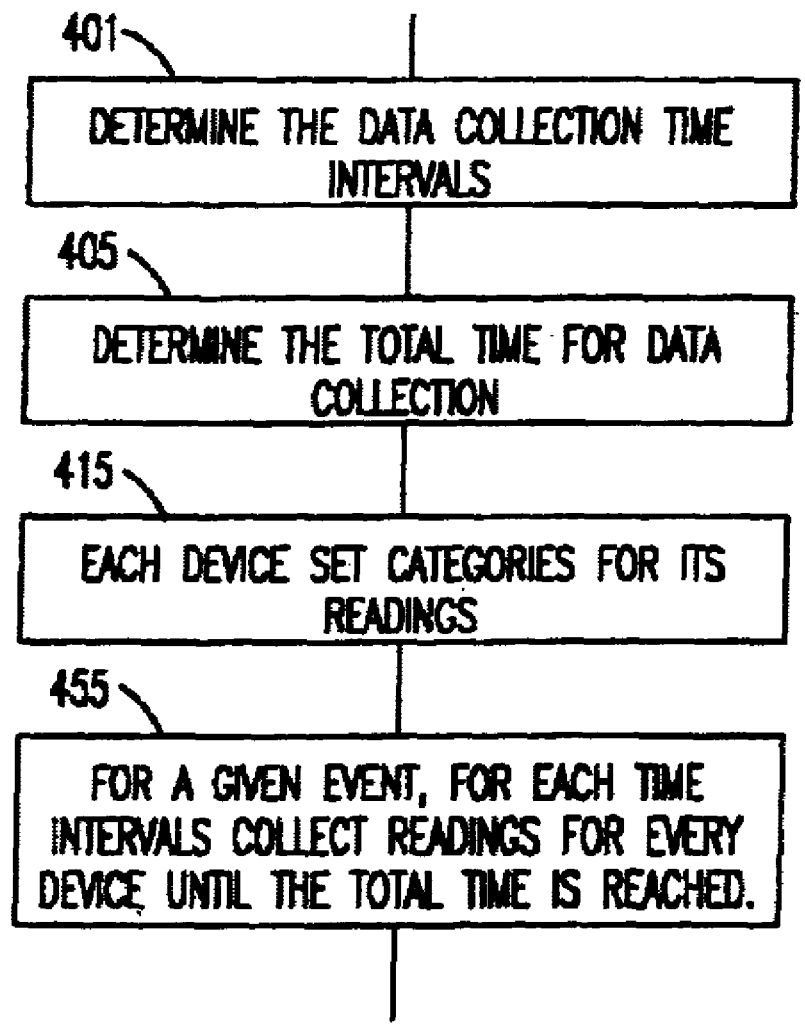
FIG. 4 is a flow chart on the data collection process according to the invention.

FIG. 4 is a flow chart on the data collection process. Function block 401 determines the data collection time intervals, such as one second intervals. This means every one second, the agent will collect the readings from all the devices. Function block 405 determines the total time for data collection, such as one minute. If for example the data collection time is one minute, then the total time for collecting data is 60+1=61 times. The first reading is obtained at time instant 0. The second reading is obtained for the time period between time instant 0 and time instant 1. In general, the $r^{th}$ reading is obtained between the time instants r−1 and r.

Function block 415 determines the sensing categories for each available devices. For example, a weight sensor within the environment can divide its weights for every 10 pounds. Thus, if the total weight range can be sensed is 100 pounds, then we can divide the sensed range into ten categories. If the average weight sensed within the time instant r−1 and r belongs to category c, we say that the $r^{th}$ reading belongs to category c. A camera can analyze images by divided the images into several categories based on the image analyzing results. As for a keyboard, we can divide the category like this. Suppose the keys on the keyboard are 0, 1, . . . , 9, a, . . . , z, A, . . . , Z. If within the time interval, the user has done nothing, then the category is 0, if he typed "0", then it is 1. If he typed "9" then it is 10, if he typed "a", then it is 11, etc. In general, suppose the keys on the keyboard are $k_1, \ldots k_n$. Then, if the user typed on key $k_i$ within the time period, then the category is i. If the user touched two keys $k_i$ and $k_j$, then the category is $(i-1) \times n+j$. If the user touches r keys, $k_1, \ldots, k_r$, then the category is $(i_1-1)n^{r-1}+(i_2-1)n^{r-2}+ \ldots +(i_{r-1})n+i_r$.

We can also group based on the commands the user types. For example, if the user typed "ls" in the Unix® operating system (OS) environment, we might categorize it as 1. In general, we have different ways of doing the categorization. Our goal here is to categorize the input in such a way that the categorization can be easily used for the eigen space method to perform the event perception task. Function block 455 is the module for collecting readings for all the devices at every time instant. At every time instant, data is collected for each device, until the time is used up. The details will be described in FIGS. 6 to 11.

Figure 5:
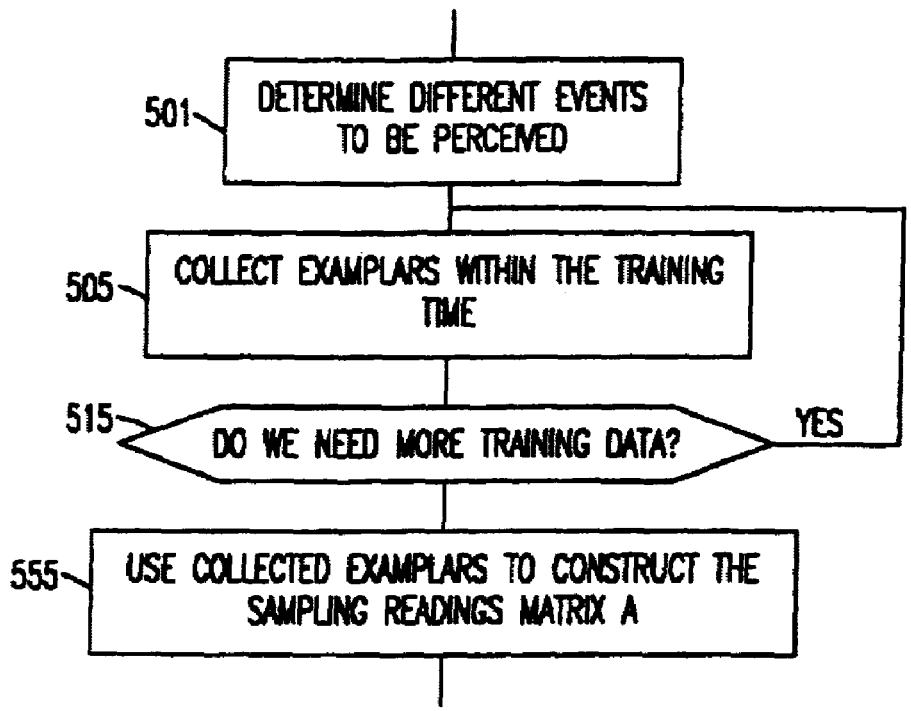
FIG. 5 is a flow chart of a data collection process for model building of a data matrix A.

FIG. 5 is a flow chart of a data collection process for model building of a data matrix A. In function block 501, the different events to be perceived are determined. Function block 505 collects exemplar within the training time, and then a determination is made in decision block 515 to determine if we need more data for training. If so, the process loops back to function block 505; otherwise, the process uses collected exemplar to construct the sampling readings to form matrix A in function block 555. Here $r_1^{ij}(0)$ is the readings of device 1 at time instant 0 for the $i^{th}$ event'$j^{th}$ exemplar. The column vector $[r_1^{ij}(0)]$ is the readings of all the devices at the time instant 0.

To model events, we collect $N_{exemplar}$ exemplar for each events. Each exemplar collects readings from devices within a time interval [0,T]. These readings are discretized into $N_{readings}+1$ readings at time instant 0, $$\frac{1}{N_{readings}}T, \ldots, \frac{N_{readings}-1}{N_{readings}}T, T.$$

For device h ($0 \leq h \leq M$), we denote its $k^{th}$ ($0 \leq k \leq N_{readings}$) readings for the $j^{th}$ ($1 \leq j \leq N_{exemplar}$) exemplar from the $i^{th}$ ($1 \leq i \leq N$) event as $r_h^{ij}(k)$.

Figure 6:
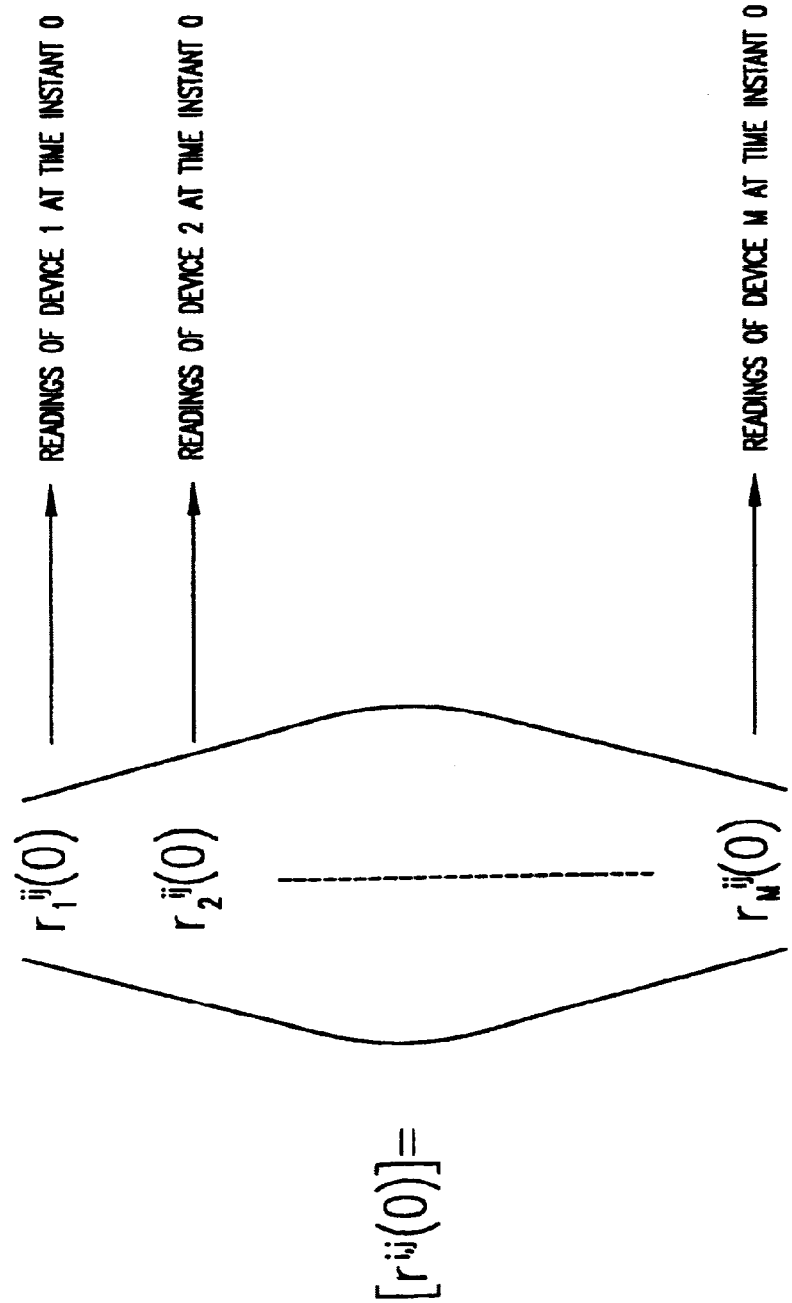
FIG. 6 is a graphical illustration of the reading data at time 0.
Figure 7:
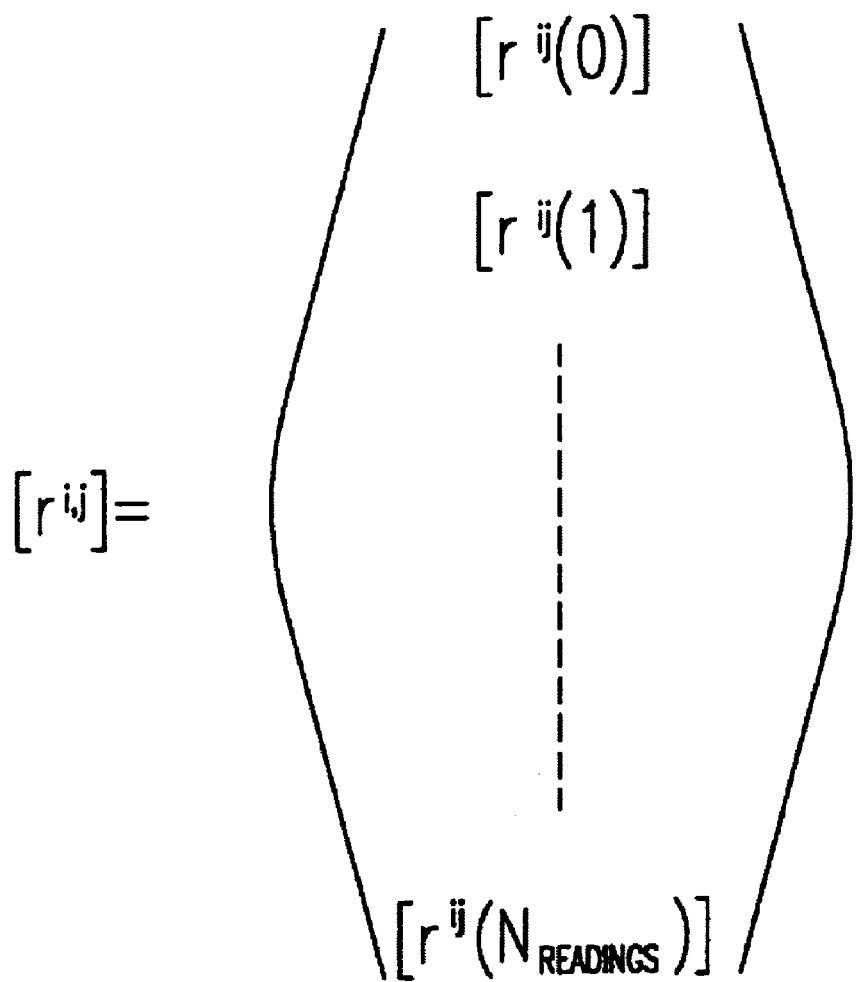
FIG. 7 is a graphical illustration of the reading data for the $i^{th}$ event's $j^{th}$ exemplar.
Figure 8:
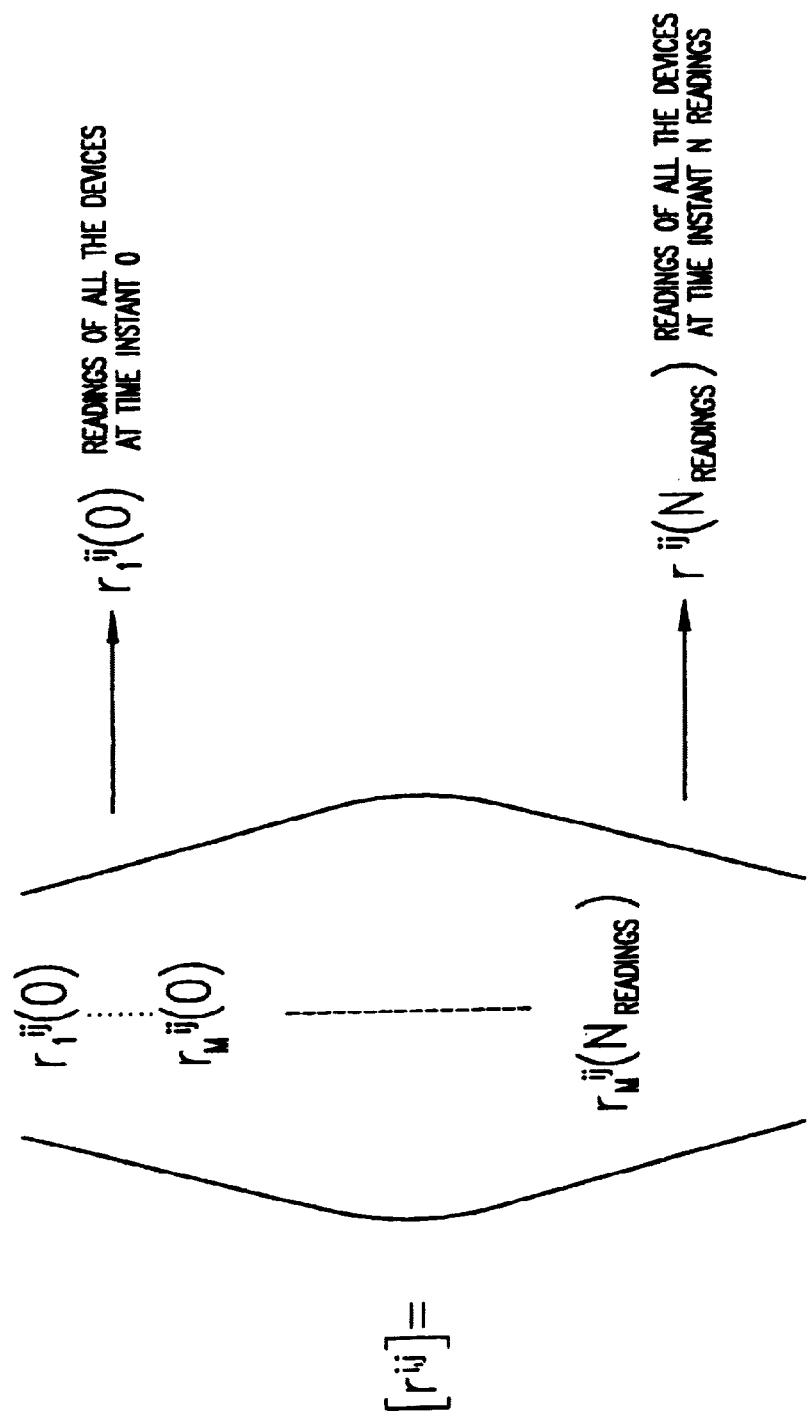
FIG. 8 is a graphical illustration showing in more detail reading data for the $i^{th}$ event'$j^{th}$ exemplar.

Let $[r_h^{ij}(k)]=(r_1^{ij}(k), \ldots, r_M^{ij}(k))^T$ be a column vector of $k^{th}$ readings of all the devices for the $j^{th}$ exemplar from the $i^{th}$ event. Let $[r^{ij}]$ represent the column vector obtained by simply concatenating the $[r^{ij}(k)]$ column vector for all the k readings, $[r^{ij}]=(r_1^{ij}(0), \ldots, r_M^{ij}(0), r_1^{ij}(1), \ldots, r_M^{ij}(1), \ldots, r_1^{ij}(N_{readngs}), \ldots, r_M^{ij}(N_{readings}))^T$. Here $[r^{ij}]$ gives the readings for the $j^{th}$ exemplar of the $i^{th}$ event. These are the readings of all the devices with respect to an exemplar in the model training phase. The length of the vector $[r^{ij}]$ is $M \times (N_{readings}+1)$ FIG. 6 is a graphical explanation of the reading of data at time 0 for the $j^{th}$ exemplar of the $i^{th}$ event. FIG. 7 illustrates the reading data for the event's $j^{th}$ exemplar. FIG. 8 illustrates a more detailed explanation of the reading data for the $i^{th}$ event's $j^{th}$ exemplar.

The sampling readings matrix A for all the events and their associated exemplar can be created by the set of all j and i of $[r^{ij}]$. $A=([r^{1,1}], \ldots, [r^{1,N_{exemplar}}], \ldots, [r^{N,1}], \ldots, [r^{N,N_{exemplar}}])$. The dimension of matrix A is $(N \times N_{exemplar})$ columns and $(M \times (N_{readings}+1))$ rows, N is the number of events and M is the number of devices. The $N \times N_{exemplar}$ columns of matrix A give readings for all the exemplar of all the events. This is the total number of training sets of data. The $M \times (N_{readings}+1)$ elements of each column gives the readings from all the devices at all the discrete time instants for an exemplar. Thus, each column of matrix A refers to a given training set, the elements of the column refers to the readings for this set. Usually $M \times (N_{readiings}+1) >> N \times N_{exemplar}$.

Figure 10:
FIG. 10 is a graphical illustration of the data matrix.

FIG. 9 illustrates the readings for all the exemplar of event i. FIG. 10 illustrates the data matrix A. FIG. 11 illustrates a more detailed data matrix A.

Matrix A can be decomposed using singular value decomposition (SVD) as:

$$A = UWV^T,$$

where $U=(U_1, \ldots, U_{N \times N_{exemplar}})$ is an orthogonal matrix of the same size as matrix A representing the principal component directions $U_i (1 \leq i \leq N \times N_{exemplar})$ in the training set. These are best directions that can clearly distinguish the training data. W is a diagonal matrix with singular values $\lambda_1, \ldots, \lambda_{N \times N_{exemplar}}$, sorted in decreasing order along the diagonal. The virtue of these values is that they rank the dimensions of the space in terms of variations along the principal component directions, and that this ranking is very often related to their importance. $V^T$ is a $(N \times N_{exemplar}) \times (N \times N_{exemplar})$ matrix that encodes the coefficients to be used in expanding each column of matrix A in terms of principal component directions.

Figure 12:
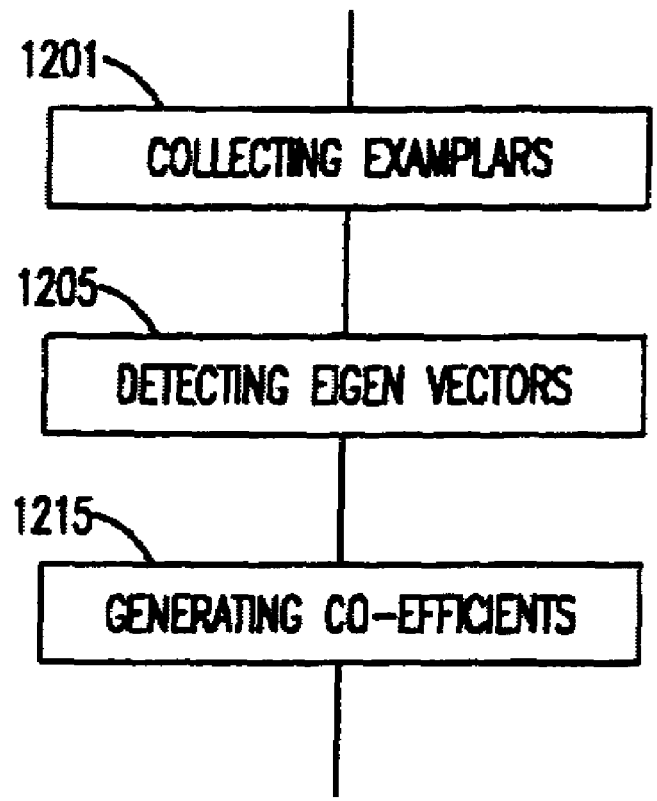
FIG. 12 is a flow chart of a co-efficient generating process of the invention.

FIG. 12 is a flow chart of a co-efficient generating process. In function block 1201, exemplar are collected to form the data matrix A. In function block 1205, the eigen vectors are generated based on the exemplar matrix. Function block 1215 generates the co-efficient for the corresponding data matrix. More particularly, the readings from the $j^{th}$ exemplar of the ith event $[r^{ij}]$ can be approximated according to the q singular values $\lambda_1 \geq, \lambda_2 \geq \ldots \geq \lambda_q$ as:

$$[r^{i,j}] = \sum_{l=1}^{q} c_l^{i,j} U_l,$$

where $q = N \times N_{exemplar}$, $c_l^{ij}$ are scalar values that can be calculated by taking the dot product of $[r^{ij}]$ and $U_l$, $c_l^{ij} = [r^{ij}]^T U_l$. This is the process of projecting the reading vector $[r^{ij}]$ onto the subspace spanned by the q basis vectors $U_1, \ldots, U_q$ with parameters $c_1^{ij}, \ldots, c_q^{ij}$. Thus, for a given i and j, we can obtain a vector $C^{ij} = (c_1^{ij}, \ldots, c_q^{ij})^T$ that gives the coefficients of the corresponding readings. For all the possible i and j, we can get a coefficient matrix $C(C^{1,1}, \ldots, C^{1,N_{exemplar}}, \ldots, C^{N,1}, \ldots, C^{N,N_{exemplar}})$.

Now, we transform matrix C into a matrix that represents the average coefficient for each event. For any event i, matrix C contain the coefficient vectors of all its exemplar: $(C^{i,1}, \ldots, C^{i,N_{exemplar}})$. The average coefficient vector for these exemplar vectors can be calculated by:

$$\vec{C} = \frac{\sum_{j=1}^{N_{exemplar}} C^{i,j}}{N_{exemplar}}.$$

The average coefficient matrix becomes $\vec{C} = (\vec{C}^1, \ldots, \vec{C}^N)$. Each column i of matrix C corresponds to the average coefficient vector $\vec{C} = (\vec{c}_1^i, \ldots, \vec{c}_q^i)$ of event i. $\vec{C}$ is the model of events learned from the training phase and will be used in event perception.

Figure 13:
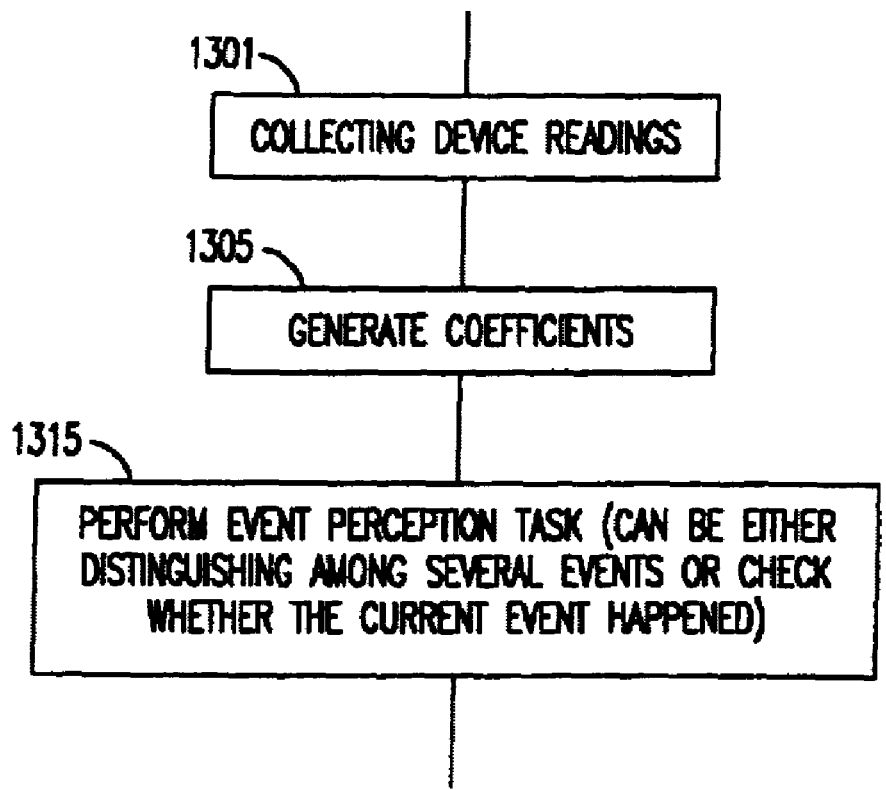
FIG. 13 is a flow chart of an even perception process without data abstraction.

FIG. 13 is a flow chart of an even perception process without data abstraction. In function block 1301, device readings are collected, and in function block 1305, coefficients are generated. These processes are quite similar to those of function blocks 1201 and 1205, respectively, in FIG. 12. Function block 1315 performs the event perception task. More particularly, the perception of events involves matching readings from all the devices in a real situation against learned models of all the events. For the same event, readings in a real application may differ from those of its exemplar because of various reasons such as noise, etc. However, they may share some commonalities or signatures. The use of eigen space approach for event perception assumes that these commonalities or signatures of a given event is captured by the coefficients of the readings along principal component directions.

Suppose $R(t) = (R_1(t), \ldots, R_M(t))^T$ is the readings from the M devices within time period [0,T]. We discretize [R(t)] into $N_{reading}+1$ at time instant 0, $$\frac{1}{N_{readings}}, \ldots, \frac{N_{readings}-1}{N_{readings}}.$$

Let [R(k)] denote the $k^{th}$ readings of all the devices at $k^{th}$ time instant. By concatenating readings from all the time instants, we obtain the column vector of matrix R which gives readings of all the devices at all the time instants.

By projecting this vector on the principal component directions, we recover a vector of coefficients, $\vec{c} = (c_1, \ldots, c_q)$, that approximate the event to be perceived as a linear combination of eigen event basis. Upon the recovery of the real situation coefficient vector, the normalized distance $\Delta_i$ between $\vec{c}$ and model coefficients $\vec{C}^i$ is used to perceive the observed event. Here $$\Delta_i = \sum_{k=1}^{q} (c_k - \vec{c}_k^i)^2.$$

The event i with the smallest distance $\Delta_i$ is considered the best match of the observed event. The above is the process when we need to distinguish which event has happened among several possible events.

During the model formulation process, we can get the following. For any event i, matrix C contains the coefficient vectors of all its exemplar, $(C^{i,1}, \ldots, C^{i,N_{exemplar}})$. The average coefficient vector for these exemplar vectors can be calculated by $$\vec{C}^i = \frac{\sum_{j=1}^{N_{exemplar}} C^{i,j}}{N_{exemplar}}.$$

The average coefficient matrix becomes $C=(\vec{C}^1, \ldots, \vec{C}^N)$. Each column i of matrix C corresponds to the average coefficient vector $\vec{C}=(\vec{c}_1^i, \ldots, \vec{c}_q^i)$ of event i.

For event i, for coefficient vector $C^{i,1}$, we can obtain an offset difference:

$$\eta^{i,1} = \sqrt{\sum_{l=1}^{q} [\bar{c}_l^i - \bar{c}_l^{i,1}]^2}.$$

Similarly, for $C^{i,2}, \ldots, C^{i,N_{exemplar}}$, we can obtain $\eta^{i,2}, \ldots, \eta^{i,N_{exemplar}}$ as follows:

$$\eta^{i,j} = \sqrt{\sum_{l=1}^{q} [\bar{c}_l^i - \bar{c}_l^{i,j}]^2}.$$

Here, j is between $1, \ldots, N_{exemplar}$. Thus, we get $\eta^{i,1}, \ldots \eta^{i,N_{exemplar}}$. We reorder the above list such that they are in the increasing order, $\eta^{i,1} \leq \ldots \leq \eta^{i,N_{exemplar}}$. These are the errors of the training exemplar sample with respect to their average case. We define an acceptance threshold such as 0.95 (or other values based on the experience).

During the event perception situation, we can collect data and calculate the coefficients $\vec{c} = (c_1, \ldots, C_q)$. We then calculate the difference $$\eta = \sqrt{\sum_{l=1}^{q} [\bar{c}_l^i - \bar{c}_l^{i,j}]^2}.$$

We then find the value of k such that
If $$\frac{k}{N_{exemplar}} \leq 0.95,$$

then we believe that event i has happened. Otherwise, we believe that event i has not happened. The above is the process when we need to figure out whether a given event has happened.

We can image that in the inter-connected world, a huge amount of devices will be involved. Events like what a person is doing can be perceived by considering only devices within an office. However, events like whether people within a building are having a meeting should be considered with all the devices within the building. In general, the bigger the scale of the events to be perceived, the more devices need to be considered. When the number of devices exceeds a certain threshold, the strategy above will not work because too much computational time is needed.

Figure 14:
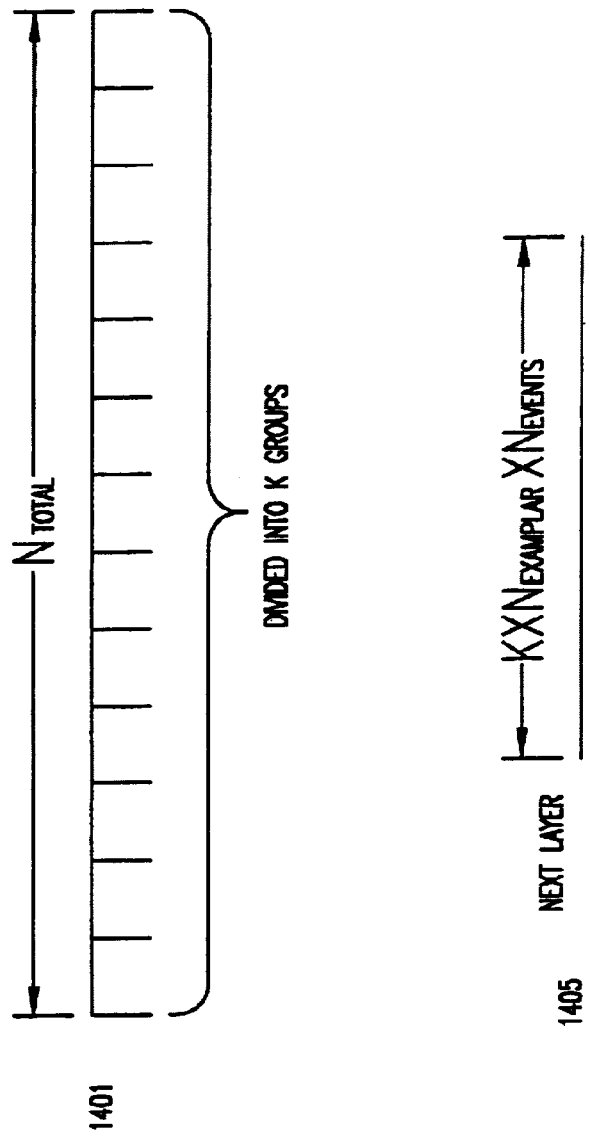
FIG. 14 is a graphical illustration for eigen pyramid construction according to the invention.
Figure 15:
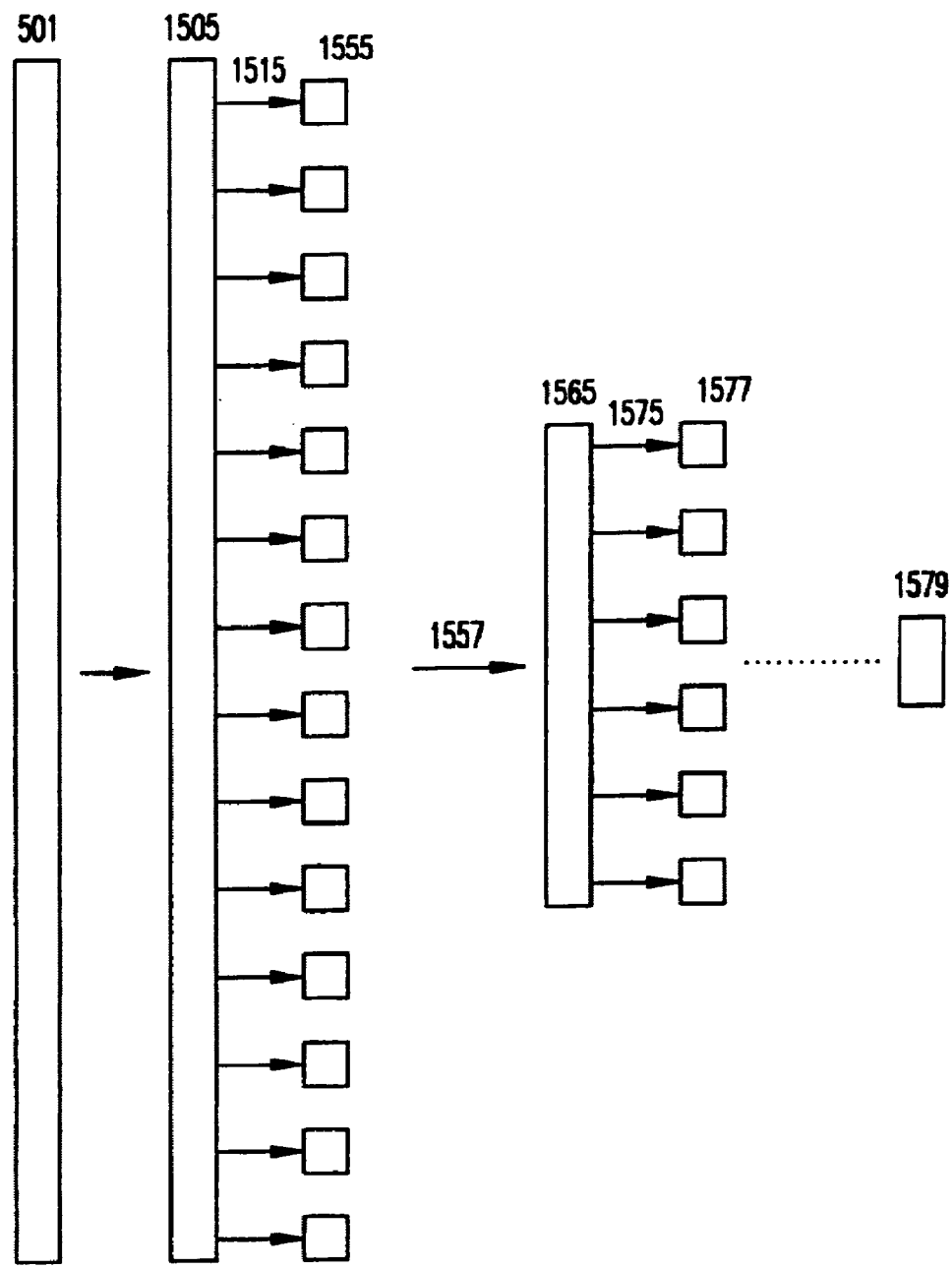
FIG. 15 is a graphical illustration for eigen-pyramid's data matrix change.
Figure 16:
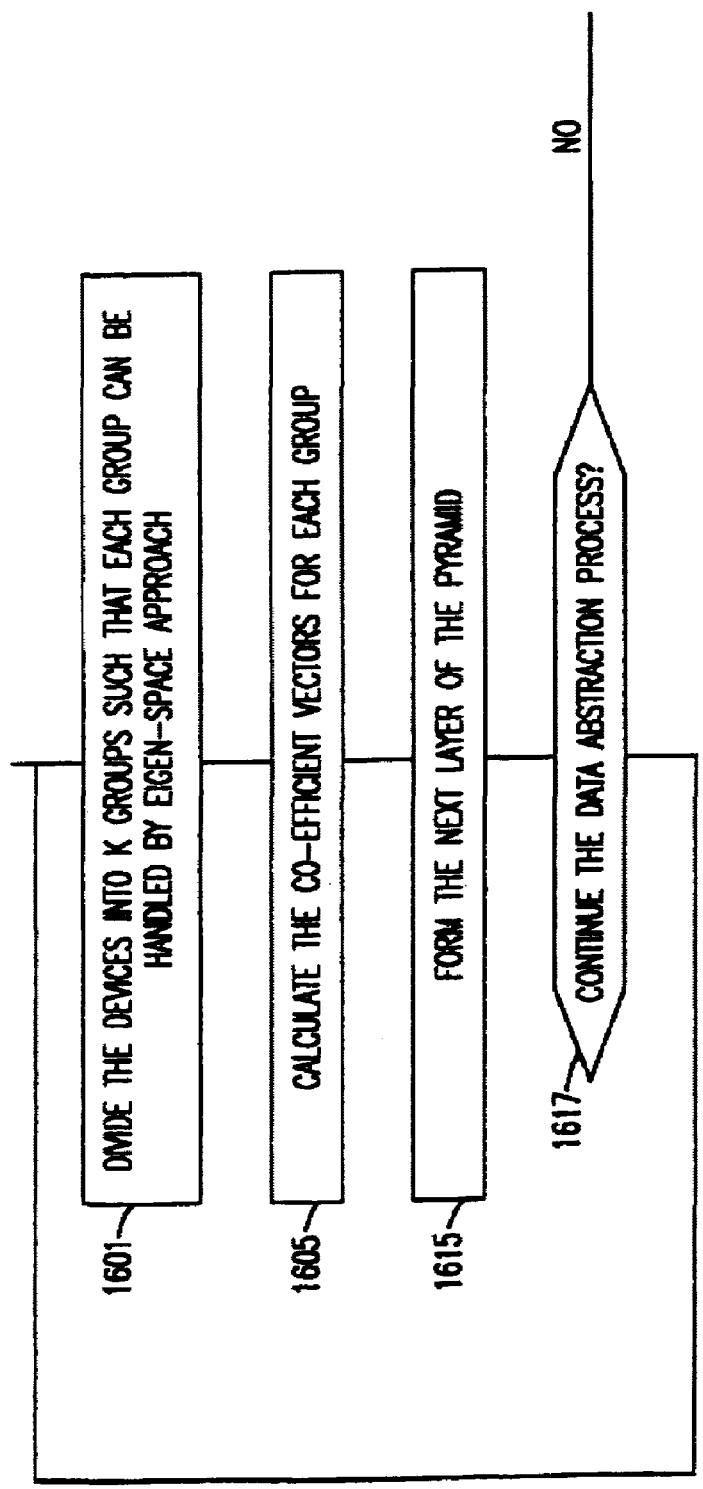
FIG. 16 is a flow chart of the eigen pyramid model construction process.

FIG. 14 is an illustration for eigen pyramid construction used in the explanation for function block 1601 in FIG. 16. FIG. 15 is an illustration for an eigen-pyramid's data matrix change.

FIG. 16 is a flow chart illustrating the eigen pyramid model construction process. Function block 1601 divides the device readings into k groups as illustrated in FIG. 14, and in FIG. 15, 1505. In order to perform event perception when the number of devices is huge, we propose a new strategy called "pyramid eigen space". Suppose $n_{acceptable}$ is the number of devices that can be handled by the above eigen space approach, shown as reference numeral 1401 in FIG. 14. Suppose $N_{total}=M \times N_{readings}+1$ is the total number of readings to be considered. Our strategy is to first divide uniformly these $N_{total}$ devices into different groups such that each group can be handled by the above eigen space method. Suppose $N_{total}=k(n_{acceptable}-1)+u_1$, where $0 \leq u < n_{acceptable}-1$. If u=0, then we can divide the devices into $n_{acceptable}-1$ groups. Otherwise, we can divide the first $k(n_{acceptable}-1)$ devices into k groups where each group has $n_{acceptable}-1$ members. Then we distribute the rest r devices into the first r groups obtained. Thus, we have divided devices into k groups, where each group has either $n_{acceptable}-1$ or $n_{acceptable}$ members.

Function block 1605 obtains the co-efficient for each group. This is illustrated in Mapping 1515, 1557 and 1575 of FIG. 15. For each group, we run the training data and detect their principal directions. Now, we collect the coefficient vector with respect to the principal directions for each training exemplar. The length of the coefficient vector is $N_{exemplar} \times N_{events}$.

Function block 1615 forms the next layer of the pyramid. This is illustrated in 1557 and 1565 of FIG. 15. Since the coefficients capture the differences in the training data, we will take coefficients of each exemplar 1555 as the input to the second level of the pyramid. By concatenating the coefficients of each group, we can obtain the new "exemplar" column vector, e.g., reference numeral 1405 in FIG. 14, which has length $$k \times N_{exemplar} \times N_{events}$$

and which should be much smaller than the original length of the "exemplar" column vector. For every old exemplar, we can get a new exemplar. Each new exemplar will be a column in the new matrix. After we put all the new exemplar together, we get a new data matrix that acts as the second layer of the pyramid.

In decision block 1617, a determination is made as to whether to continue the data abstraction process. If so, the process loops back to function block 1601; otherwise, the process ends.

At the first stage, the length for each training vector (exemplar) is $N_{total}$. During the process above, they are divided into k groups. Each group generates $N_{exemplar} \times N_{events}$ coefficients. Thus, the total length for the second level of input will be $k \times N_{exemplar} \times N_{events}$, which is much less than $N_{total}=k(n_{acceptable}-1)+r$.

If $k \times N_{exemplar} \times N_{events} > n_{acceptable}$, we take this new data as input and repeat the above data abstraction process to further reduce the amount of data.

If $k \times N_{exemplar} \times N_{events}$ is much less than $n_{acceptable}$ and a further eigen coefficient extraction is meaningless, then we take these $k \times N_{exemplar} \times N_{events}$ numbers as the final coefficients of the training exemplar.

If $k \times N_{exemplar} \times N_{events}$ is less than $n_{acceptable}$ and a further eigen coefficient extraction is meaningful, then we take another round of eigen coefficient extraction. These newly generated coefficients 1577 will be taken as the final coefficients of the exemplar of the training events.

These new coefficients will be taken as the final coefficients of the exemplar of the training events. After extracting the final coefficients of all the exemplar of all the events, the average of the final coefficients of all the exemplar with respect to a given event are taken as the model for the corresponding event. Just like what we did in the single layer case, these models are generated and used to perform the event perception task.

Figure 17:
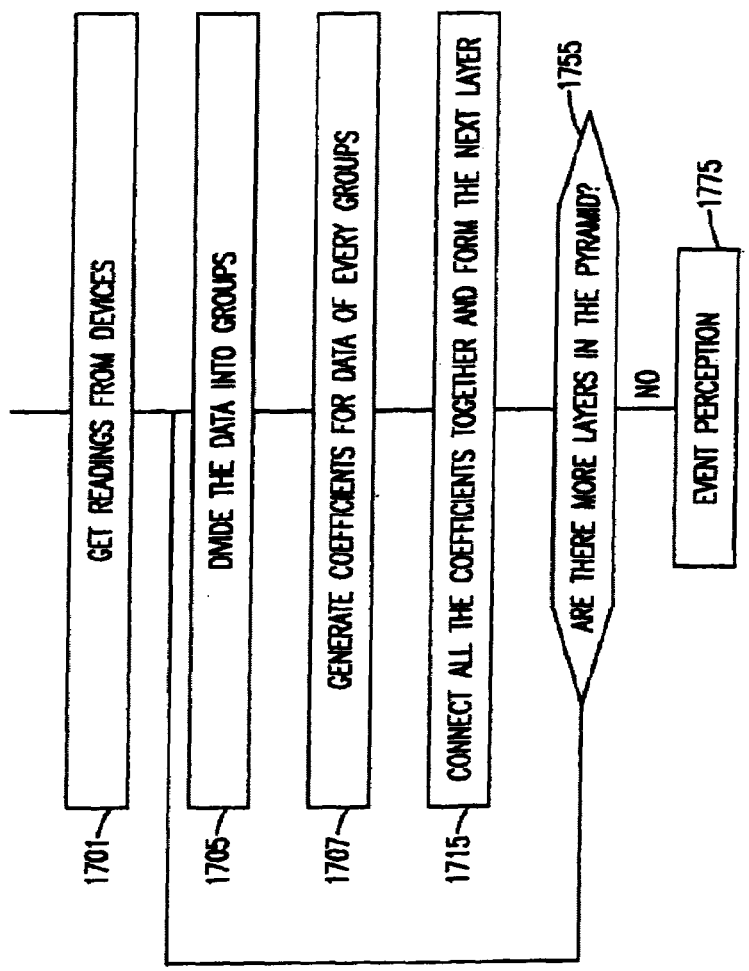
FIG. 17 is a flow chart of an extraction process for extracting the signature of the real measured data during the event perception process.

During the event perception phase, we can first get readings from all devices. FIG. 17 is a flow chart of an extraction process for extracting the signature for each divided group of the real measured data during the event perception process. Function block 1701 collects data from devices during the event perception process. Then according to the division when the pyramid is built, function block 1705 divides the initial data into different groups the same way as the pyramid model generation process when this corresponding layer is being built. We extract coefficients for the data of each group with respect to the principal directions of the first layer of the pyramid formed during the training phase in function block 1707 and, in function block 1715, the coefficients are connected to form the next layer. A determination is made in decision block 1755 as to whether there are more layers (e.g., 1579) in the pyramid. If so, the process loops back to function block 1705; otherwise, the event perception is output at output block 1775.

Figure 18:
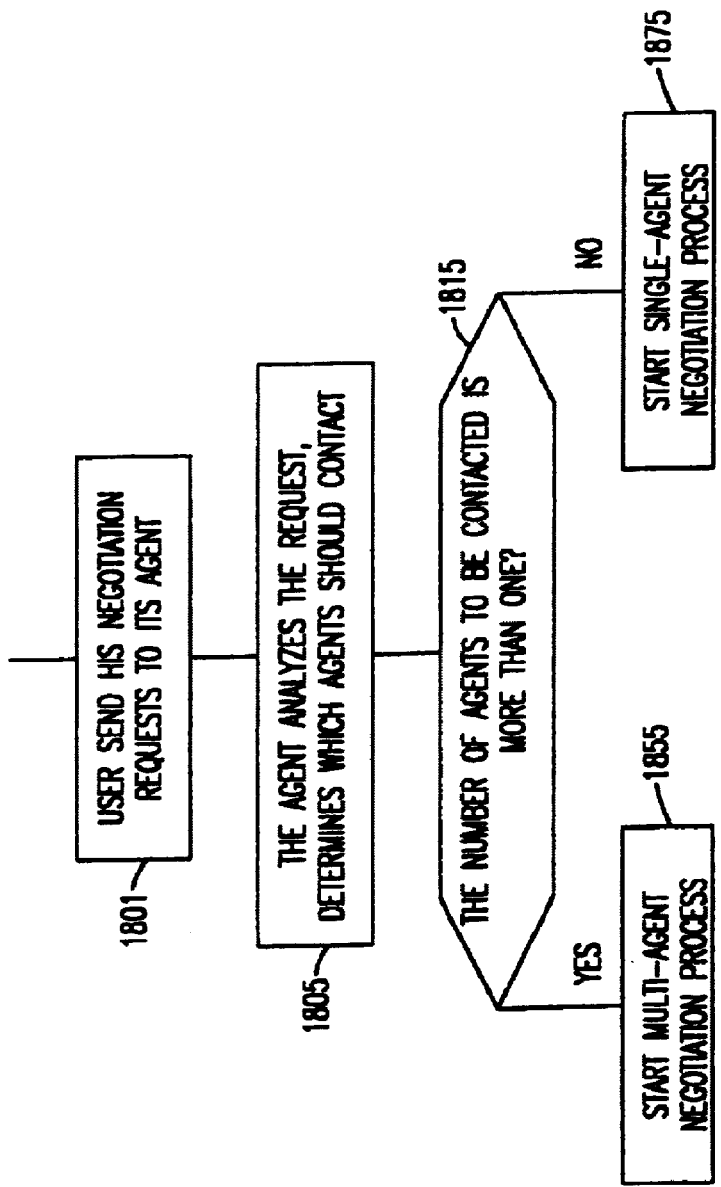
FIG. 18 is flow chart of a start negotiation process.

FIG. 18 is flow chart of a start negotiation process. In function block 1801, the user sends his negotiation request via the multi-modal interface to its agent. In function block 1805, the agent analyzes the request and determines, based on the input, which agents are to be contacted. Decision block 1815 checks to determine if the total number of agents to be contacted is more than one or not. If so, the process goes to function block 1855 to start the multi-agent negotiation process. Otherwise, the process goes to function block 1875 to start single agent negotiation process.

Figure 19:
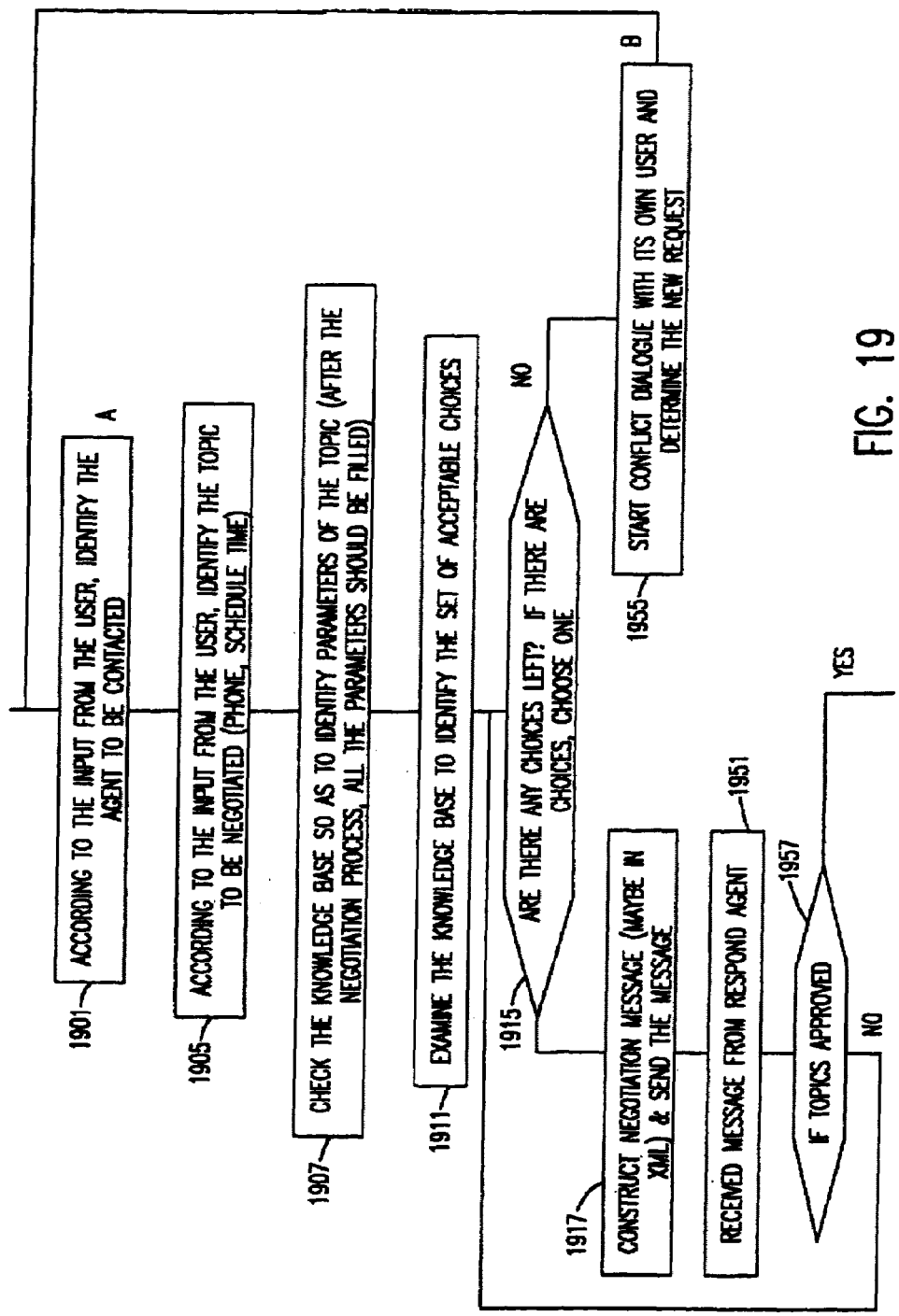
FIG. 19 is a flow chart of a start agent process run during the single agent negotiation process.

FIG. 19 is a flow chart of a start agent process run during the single agent negotiation process. Function block 1901 identifies the other agents to be contacted. Function block 1905 identifies the topics to be negotiated, such as making a phone call or make an appointment. Function block 1907 checks the knowledge data base 207 (FIG. 2) so as to identify parameters of the topic. For example, for scheduling a time, there should be a start time, an end time, and the attendees of the meeting, etc. Function block 1911 examines the knowledge data base to identify the set of acceptable choices. In decision block 1915, a check is made to determine whether there is at least one choice left. If so, function block 1917 asks the negotiation module 205 (FIG. 2) to construct a negotiation message and send the message. It can be in the form of XML (eXtended Markup Language) or other protocols. At function block 1951, a message is received from responding agent. Then, in decision block 1957, a determination is made as to when the agent received messages from the responding agent about whether the request is approved or not. If not, the process loops back to function block 1915; but if so, the process exits. Returning now to decision block 1915, if there are no choices left, a conflict dialogue is started with its own user in function block 1955 to determine a new request.

Figure 20:
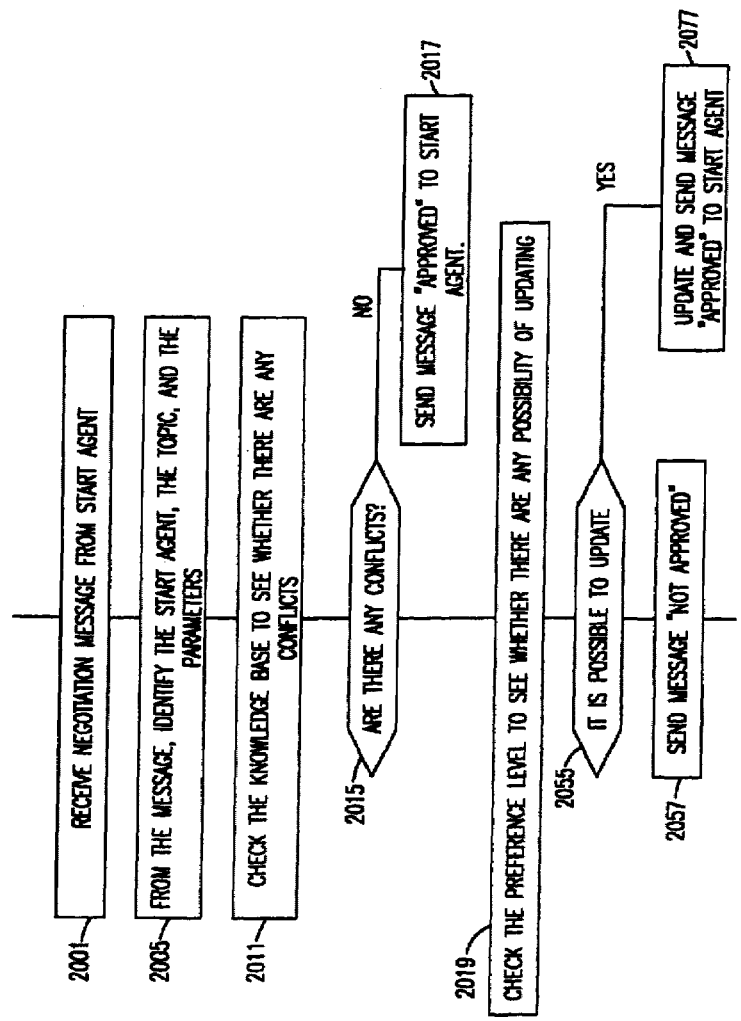
FIG. 20 is a flow chart of a respond agent process run during the negotiation process.

FIG. 20 is a flow chart of a responding agent process run during the negotiation process. The agent receives the negotiation request from the starting agent in function block 2001. In function block 2005, the responding agent identifies the starting agent, the topic, and the parameters. In function block 2011, the responding agent check the knowledge base to see whether there are any conflicts. If there is no conflicts, as determined in decision block 2015, the starting agent simply sends a message "approved" in function block 2017. Otherwise, the preference level is checked in function block 2019 to see whether there are any possibility of updating. For example, although at a certain time the user has a meeting with a colleague, but since the starting agent works for the CEO of the company, the original appointment should be replaced by the new appointment. If after checking the knowledge data base in decision block 2055 it is determined that it can be updated, then simply update in function block 2077. Otherwise, a "not approved" message is sent to the starting agent in function block 2057.

Figure 21:
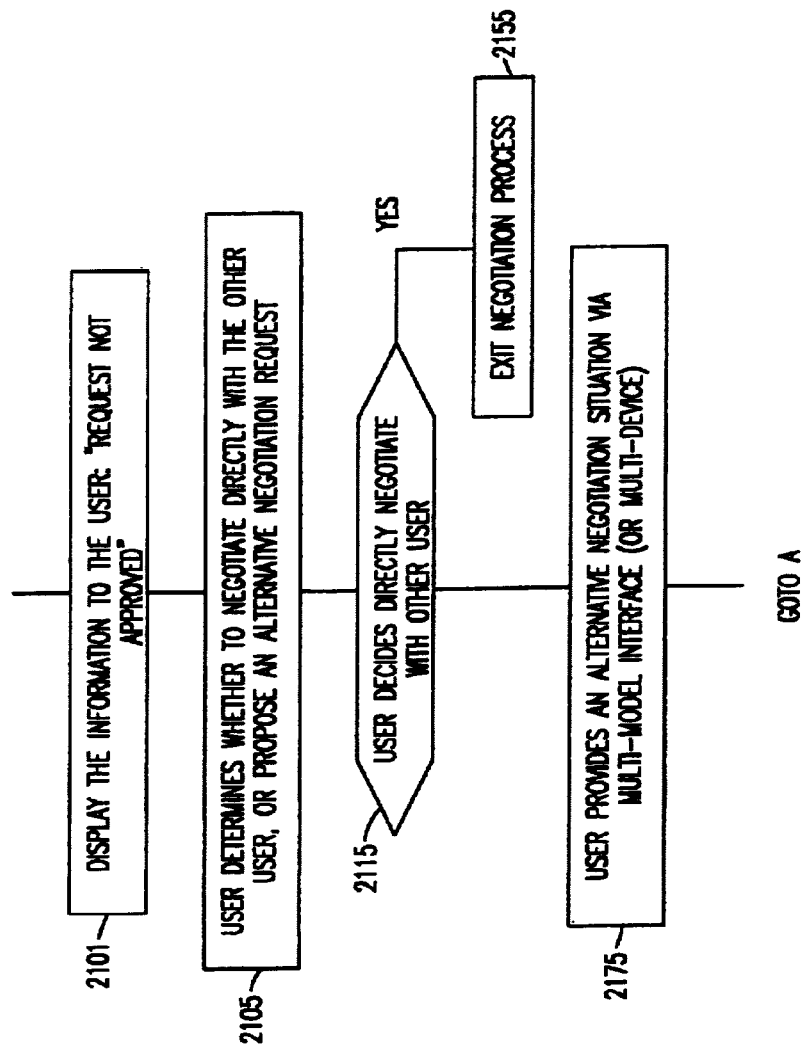
FIG. 21 is a flow chart of a dialogue process for the start agent to handle conflict with its user.

FIG. 21 is a flow chart of a dialogue process for the start agent to handle conflict with its user. Function block 2101 displays information to the user via multi-modal device such as a screen or a voice channel; i.e., "request is not approved". After receiving the message, it is the user who needs to determine whether to negotiate directly with the other user in function block 2105. If the user decides to directly negotiate with the other user, as determined in decision block 2115, the agent system is bypassed in function block 2155. If not, in function block 2175, the user can propose an alternative negotiation request and send the request to the agent via multi-model interface.

Figure 22:
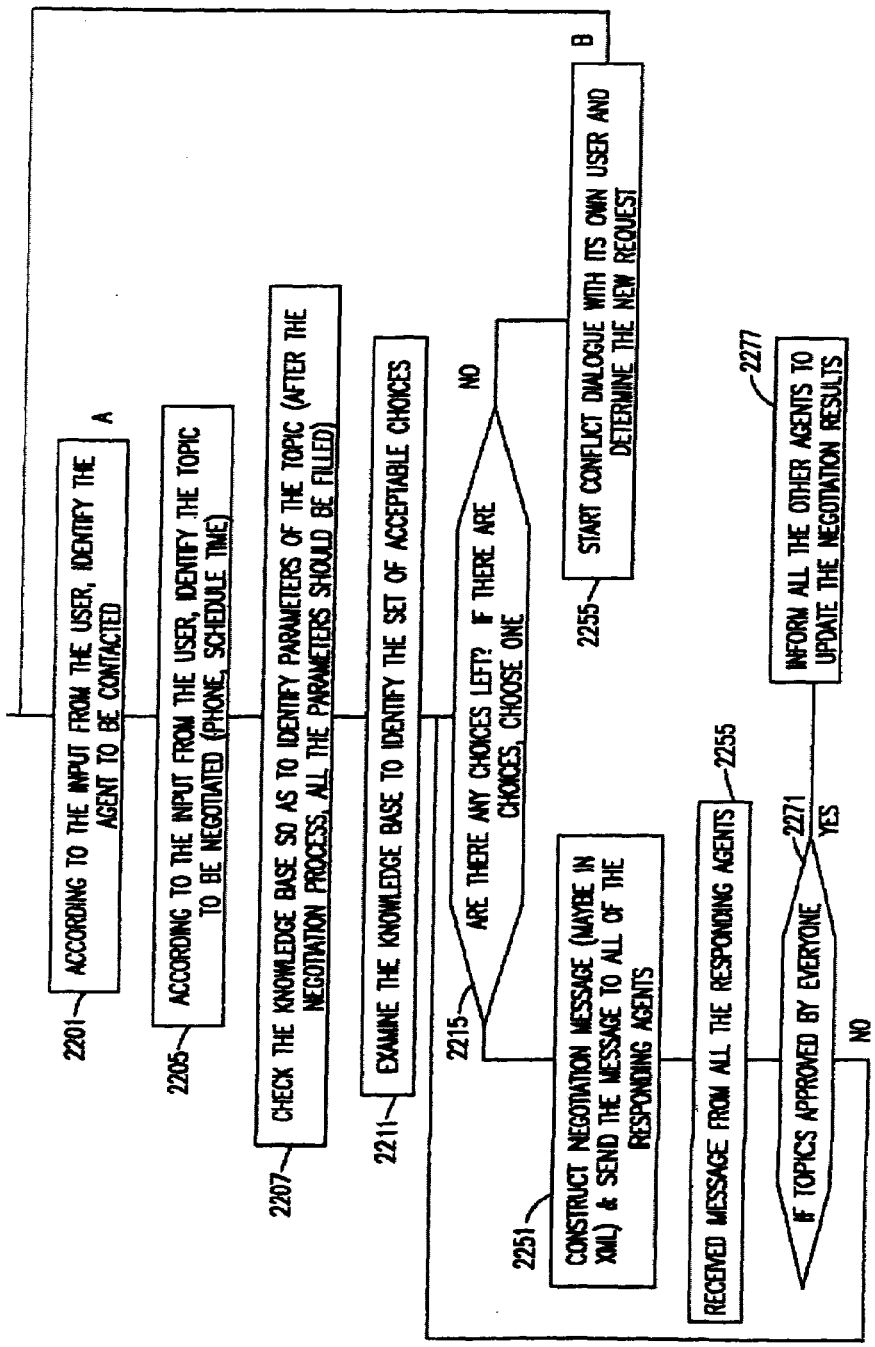
FIG. 22 is a flow chart of the start agent during the group agent negotiation process.

FIG. 22 is a flow chart of the start agent during the group agent negotiation process. In function block 2201, the group of agents to be contacted is identified. According to the input of the user, function block 2205 identifies the topic to be negotiated (e.g., phone, schedule time, etc.). A check of the knowledge data base is made in function block 2207 to identify parameters of the topic. Function block 2211 examines the knowledge data base to identify the set of acceptable choices. A determination is made in decision block 2215 if there are any choices left and, if so, in function block 2251, the agent constructs a negotiation message (can be in XML form) and sends the message to all of the responding agents. In function block 2255, the starting agent receives all the messages from all the responding agents. Decision block 2271 checks whether the request is approved by every responding agent. If so, the process goes to function block 2277 to inform all the other agent about the final negotiation results; but if not, the process loops back to decision block 2215. Returning to decision block 2215, if there are no more choices left, then a conflict dialogue is stared with its own user in function block 2255 to determine the new request, and the process loops back to function block 2201.

Figure 23:
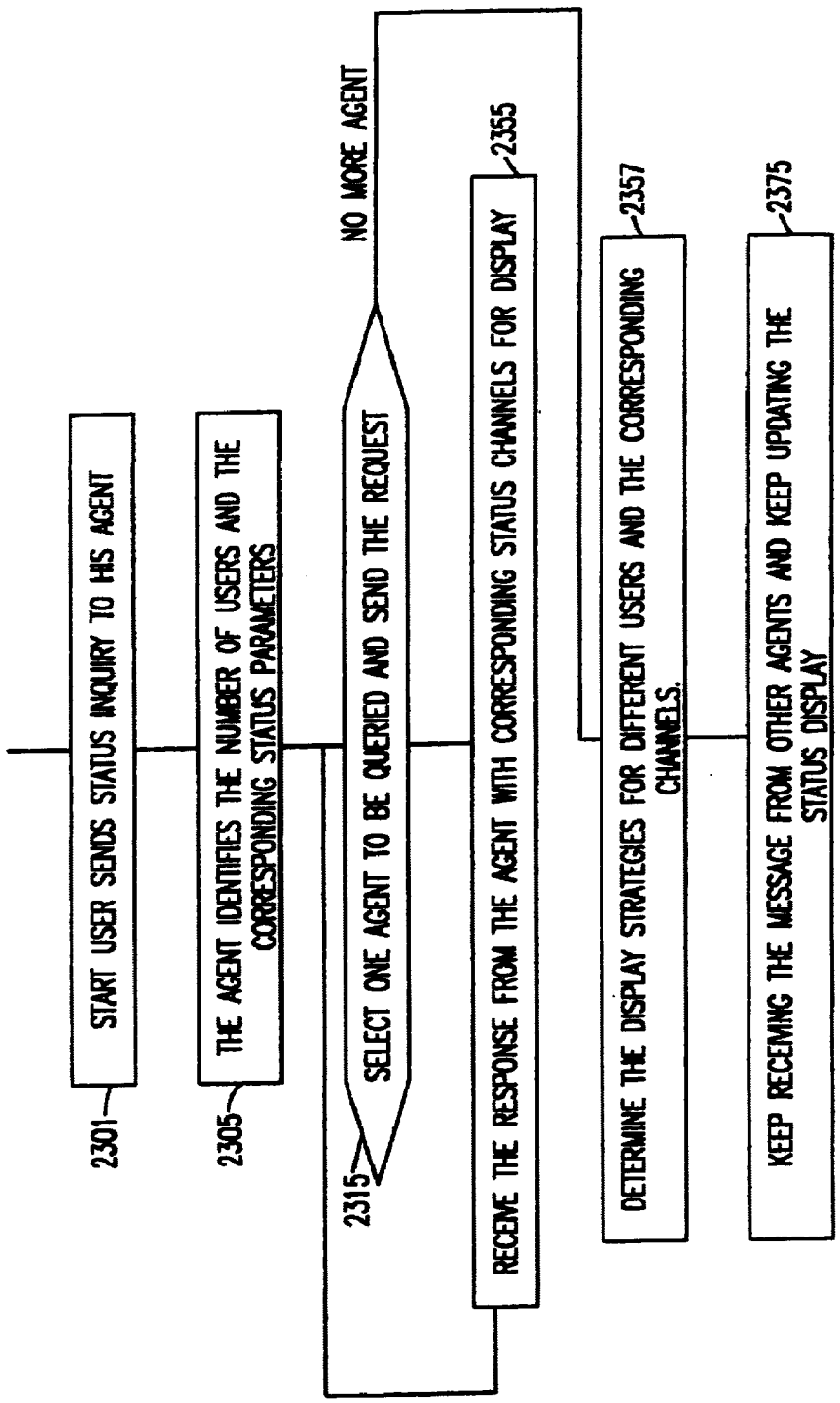
FIG. 23 is a flow chart of a privacy guarding process for privacy guarding for the start agent during the group awareness process.

FIG. 23 is a flow chart of a privacy guarding process for the start agent during the group awareness process. This is an idea to keep the privacy of its user so that it can not be invaded. In other words, "I only let you know what I want you to know". In function block 2301, the user sends an inquiry to his agent about the status of the other users, such as whether they are making a phone call, they are working right now, etc. In function block 2305, the agent identifies the number of users and the corresponding status parameters. In decision block 2315, the agent selects one agent from the agent pools to be queried and send the request. If every agent has been queried, the process goes to function block 2357; otherwise, in function block 2355, the starting agent receives the response from the agent to be queried, and the process loops back to decision block 2315. The response for the queried agent can contain what information you can display and using which channel. Returning to function block 2357, a determination is made as to the display strategies for different users and the corresponding channels; for example, how to display the corresponding message, what content to display, etc. In function block 2375, the starting agent keeps receiving messages from the other agents about the status of their users, and the starting agent will keep displaying the status of the other users.

Figure 24:
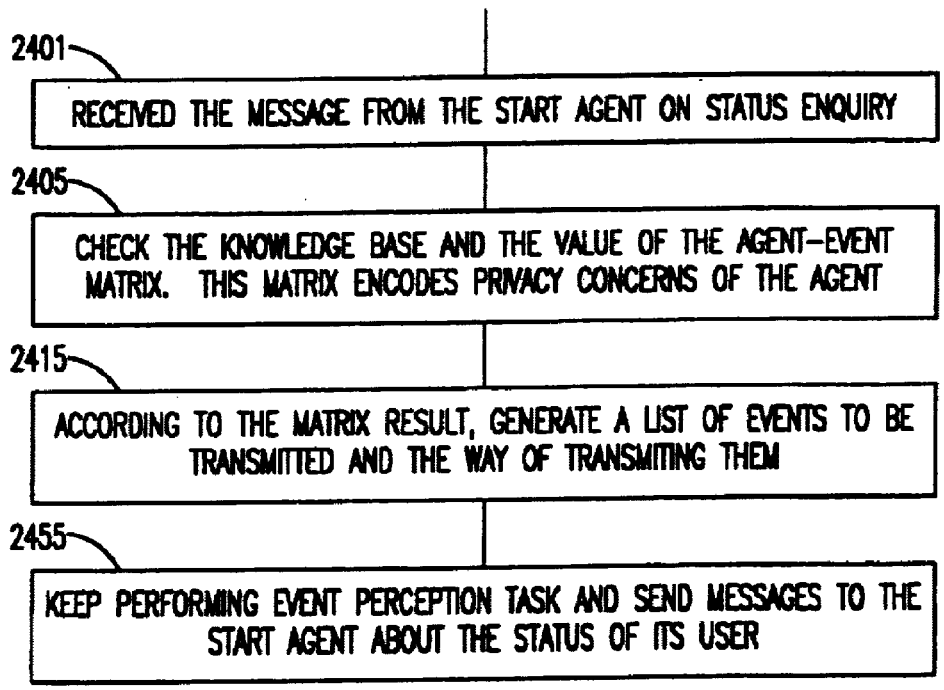
FIG. 24 is a flow chart showing the procedure for the respond agent during the privacy guarding process.

FIG. 24 is a flow chart of the procedure for the responding agent during the privacy guarding process. Function block 2401 receives the message from the starting agent on the status query. Function block 2405 checks its knowledge data base and the value of the agent-event matrix. This matrix encodes the privacy concerns of the agent about its user. Function block 2415 generates the list of events to be transmitted and the way of transmitting them. Function block 2455 keeps performing the event perception task and sends messages to the start agent about the status of its user. The agent-event matrix is used to determine what to send.

Figure 25:
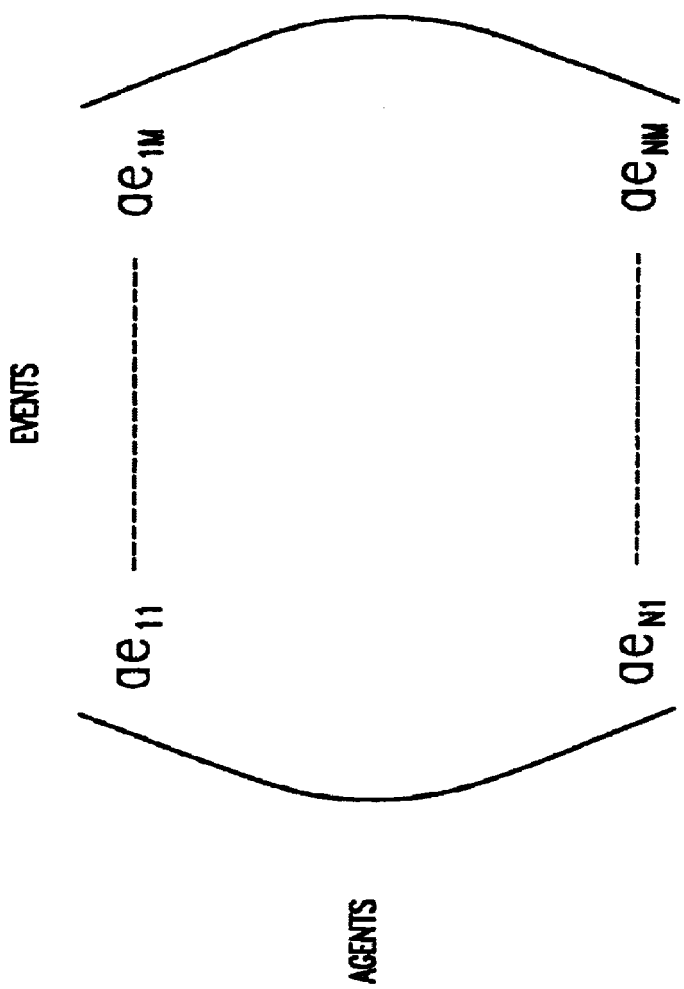
FIG. 25 is a graphical illustration of the Agent-Event matrix for a given agent used to guard the privacy of the agent's user.

FIG. 25 graphically illustrates the Agent-Event matrix for a given agent used to guard the privacy of the agent's user. The rows represent different events. The columns represent agents, ae, represent the situation for event i to be sent to agent j. For each event, the agent divides them into different categories. Thus, each event is associated with a set of different values. If $ae_{ij}=-1$, then the responding agent will not give any information about event i to the agent j. If $ae_{ij}=0$, then the responding agent will display exactly what it perceived. If $ae_{ij}=t>0$, then the responding agent will always transmit the value of the t to the starting agent.

Figure 26:
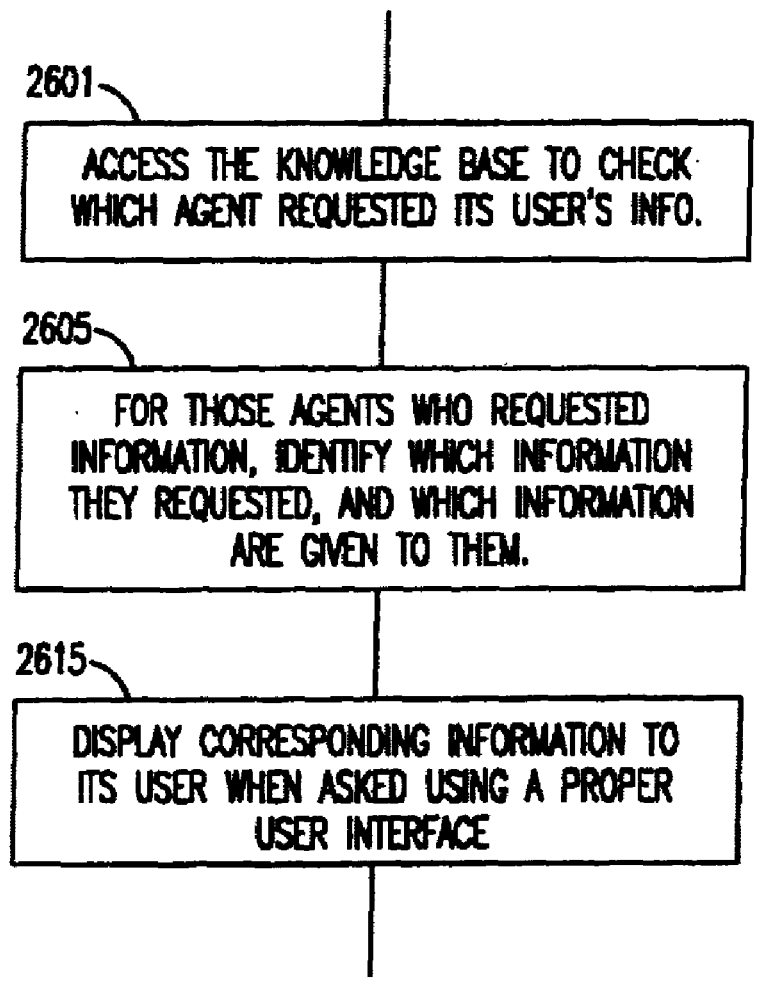
FIG. 26 is a flow chart showing the awareness process for an agent's own user.

FIG. 26 is a flow chart illustrating the awareness process for an agent's own user. The goal is to provide its own user about who is monitoring him. Function block 2601 accesses the knowledge data base to check which agent requested its agent's info. Function block 2605 identifies the information other agent requested, and which information was given to them. Function block 2615 displays the corresponding information to its user when asked using a proper user interface.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer supported cooperative work (CSCW) system comprising:
    a server which handles messages among a plurality of agents and network channels between the agents and the server, each of said agents communicating with a corresponding device in an environment, the corresponding device, after analyzing a sensed data, dividing the results into several categories and sending a message through a communication channel to the corresponding agent, the agents analyzing data received from the corresponding devices and, when other agents ask about a status of an agent's user, after a negotiation process, the agent provides relevant information; and
    a plurality of multi-modal communication channels for facilitating communication with devices in the environment by a user, the multi-modal communication channels serving as sensing channels for devices to sense data from the environment, the user and various activities of the user,
    wherein the sensed data is at least events associated with the environment of the agent's user and the categories are at least divisions of sensed ranges associated with the corresponding device.

2. The CSCW system according to claim 1, wherein each agent comprises:
    a negotiation module which is responsible for negotiations with another agent or agents, the negotiation module parsing messages back and forth between itself and another agent, wherein when the agent wants to pass information to other agents, the agent first sends the information to the server and then the server passes the information to the negotiation module of the other agent or agents;
    a generation module which generates plans for the agent to negotiate with other agents or to transmit information through a multi-modal user interface module and finally received by the user, the negotiation module passing messages back and forth between the plan generation module; and
    an event perception module and a knowledge data base, the plan generation module consulting the event perception module and the knowledge data base to generate plans, the knowledge data base storing various data bases for the user and having an inference rule to generate plans, the event perception module perceiving events and providing results to the plan generation module when queried, and the plan generation module generating plans based on a content of the event perception module and the knowledge data base.

3. The CSCW system according to claim 2, wherein the event perception module uses an eigen space to perform the event perception task, wherein the eigen space at least uses signatures of a given event captured by the coefficients of the readings along principal component directions.

4. The CSCW system according to claim 3, wherein when the number of devices is large, the event perception module constructs an eigen pyramid to discriminate different events.

5. A computer supported cooperative work (CSCW) method comprising the steps of:
    communicating by a plurality of agents with a corresponding plurality of devices;
    sending by the plurality of devices information relating to sensed data through a communication channel to corresponding ones of the plurality of agents;
    analyzing all the data received from all the devices and performing event perception and, when other agents ask about a status of an agent's user, negotiating with the other agents and providing relevant information; and
    facilitating communication with devices in the environment by a user through a plurality of multi-modal communication channels, the multi-modal communication channels serving as sensing channels for devices to sense the environment, the user and various activities of the user.

6. The CSCW method according to claim 5, wherein each agent performs the steps of:
    conducting negotiations with another agent or agents; and
    generating plans for the agent to negotiate with other agents or to transmit information through a multi-modal user interface by perceiving events and providing results, and consulting a knowledge data base storing various data bases for the user and having an inference rule to generate plans, the generated plans being based on a content of the perceived events and the knowledge data base.

7. The CSCW method according to claim 6, wherein the step of conducting negotiations including parsing messages back and forth between itself and another agent.

8. The CSCW method according to claim 6, wherein an eigen space performs the event perception task, and the eigen space at least uses signatures of a given event captured by the coefficients of the readings along principal component directions.

9. The CSCW method according to claim 8, wherein when the number of devices is large, an eigen pyramid is constructed to discriminate different events.

10. The CSCW method according to claim 5, wherein events sensed by at least some of said devices are continuous, the method further comprising the step of dividing the sensed continuous data into categories.

11. The CSCW method according to claim 10, wherein the step of dividing is performed by the devices and the categories are sent by the devices to corresponding agents.

12. The CSCW method according to claim 10, wherein the step of dividing is performed by agents receiving sensed continuous data from corresponding devices.

13. The CSCW method according to claim 5, wherein events sensed by at least some of said devices are discrete, the method further comprising the step of dividing the sensed discrete data into categories.

14. The CSCW method according to claim 13, wherein the step of dividing is performed by the devices and the categories are sent by the devices to corresponding agents.

15. The CSCW method according to claim 13, wherein the step of dividing is performed by agents receiving sensed discrete data from corresponding devices.

16. The CSCW system according to claim 2, wherein the event perception module perceives events by matching readings from the devices to sense the environment against learned models of all events.

* * * * *